(12) United States Patent
Oikawa et al.

(10) Patent No.: US 7,476,038 B2
(45) Date of Patent: Jan. 13, 2009

(54) OPTICAL DEVICE MODULE

(75) Inventors: Yoichi Oikawa, Yokohama (JP);
Hirofumi Aota, Yokohama (JP);
Kazuaki Akimoto, Yokohama (JP);
Hideyuki Miyata, Kawasaki (JP);
Tadao Nakazawa, Kanagawa (JP);
Yumi Nakazawa, legal representative, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/805,481

(22) Filed: Mar. 22, 2004

(65) Prior Publication Data
US 2005/0089282 A1 Apr. 28, 2005

(30) Foreign Application Priority Data
Oct. 22, 2003 (JP) ............... 2003-362530

(51) Int. Cl.
*G02B 6/00* (2006.01)
*G02B 6/44* (2006.01)

(52) U.S. Cl. .......................................... 385/92; 385/94
(58) Field of Classification Search ............ 385/92
See application file for complete search history.

(56) References Cited

U.S. PATENT DOCUMENTS

| 5,994,679 | A | * | 11/1999 | DeVeau et al. | 219/530 |
| 6,583,388 | B2 | * | 6/2003 | Crafts et al. | 219/209 |
| 2003/0063887 | A1 | * | 4/2003 | Seal et al. | 385/134 |
| 2003/0089694 | A1 | | 5/2003 | Crafts et al. | |
| 2003/0161593 | A1 | * | 8/2003 | Stackhouse | 385/92 |
| 2003/0161594 | A1 | | 8/2003 | Hasegawa et al. | |
| 2005/0078919 | A1 | * | 4/2005 | Mori et al. | 385/92 |

FOREIGN PATENT DOCUMENTS

| EP | 0 929 206 | 12/1998 |
| EP | 1 191 361 | 9/2001 |
| GB | 2 368 140 | 4/2002 |
| JP | 8-146369 | 6/1996 |
| JP | 9-049994 | 2/1997 |
| JP | 11-326855 | 11/1999 |
| JP | 2000-075152 | 3/2000 |
| JP | 2000-249853 | 9/2000 |
| JP | 2001-330811 | 11/2001 |
| JP | 2002-090563 | 3/2002 |

OTHER PUBLICATIONS

Seino, Minoru, "LiNbO3 Tunable Wavelength Filter", Optorics, 1995.5 No. 209.
Nakazawa, T., et al., "Development of Lithium-Niobate Tunable Filters", Technical Research Reports of the Institute of Electronics, Information and Communication Engineers, OPE 96-110~128, Dec. 12, 1996.

* cited by examiner

*Primary Examiner*—Michelle R Connelly Cushwa
(74) *Attorney, Agent, or Firm*—Staas & Halsey LLP

(57) ABSTRACT

An optical device module includes an optical device, a soaking unit fixed to one surface of the optical device, a heating/cooling unit fixed to one surface of the soaking unit, a heat-insulating unit fixed to one surface of the heating/cooling unit, and a package that houses the optical device, the soaking unit, the heating/cooling unit, and the heat-insulating unit and to which the heat-insulating unit is fixed. The heating/cooling unit heats the optical device using self-generated heat or cools the optical device via the soaking unit.

24 Claims, 19 Drawing Sheets

LENGTH OF SUBSTRATE

FIG. 11
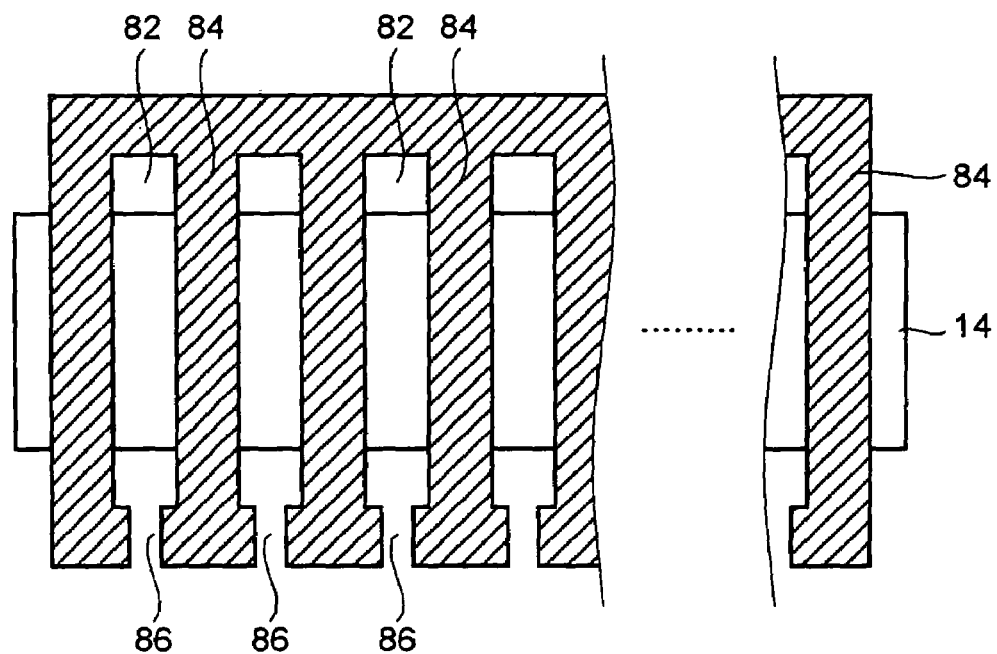
FIG. 12
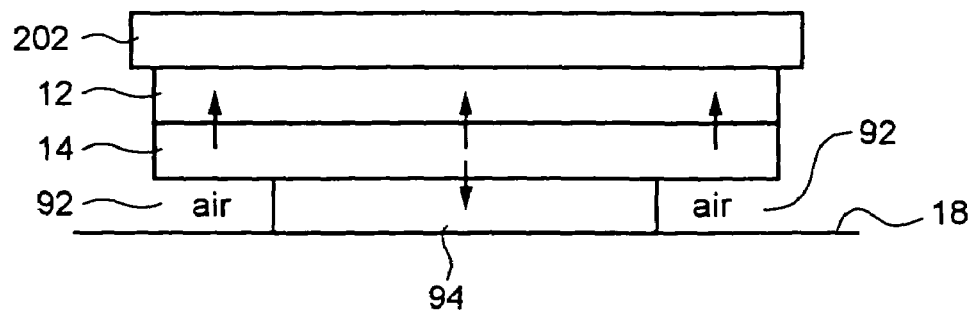

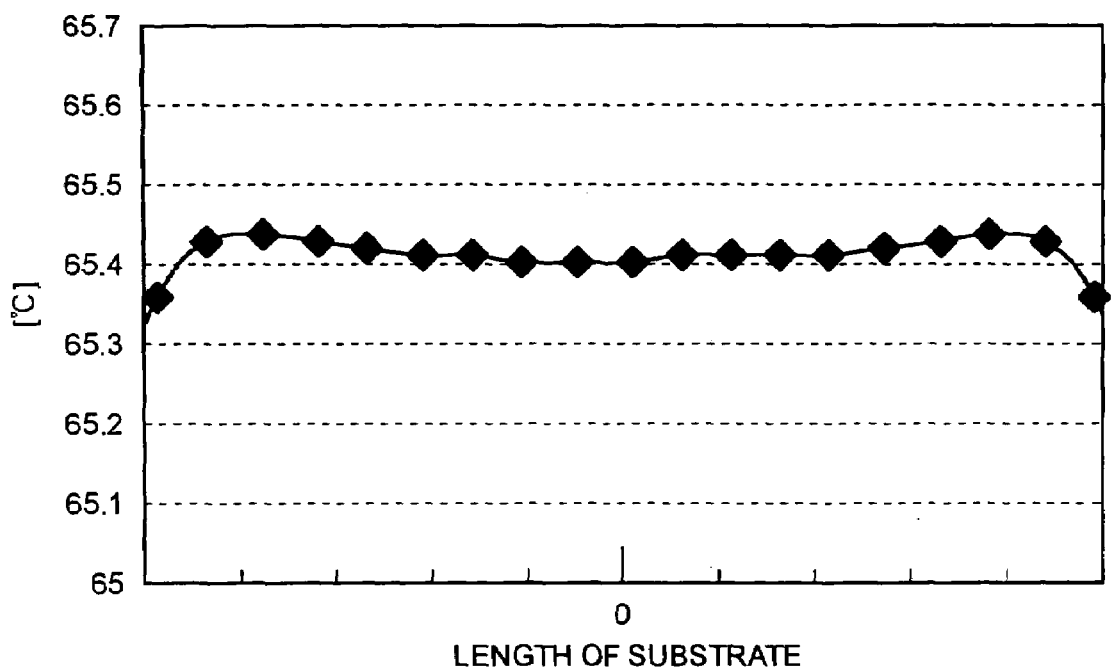

FIG. 17
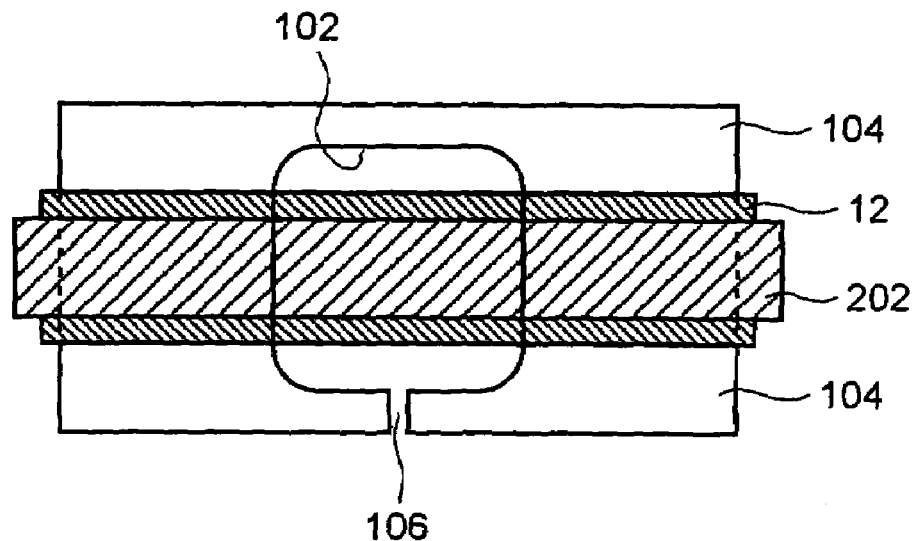
FIG. 18
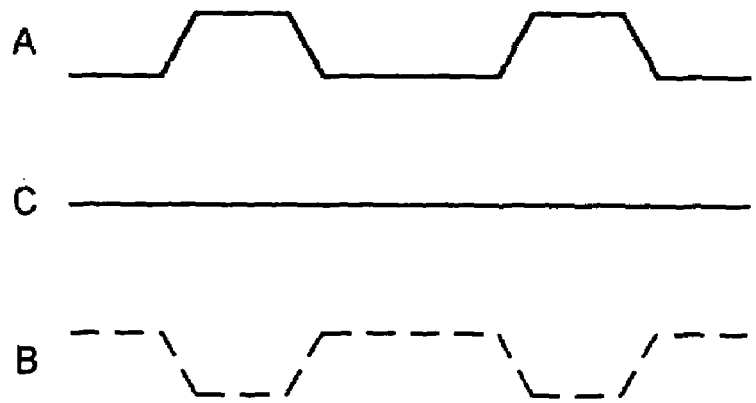
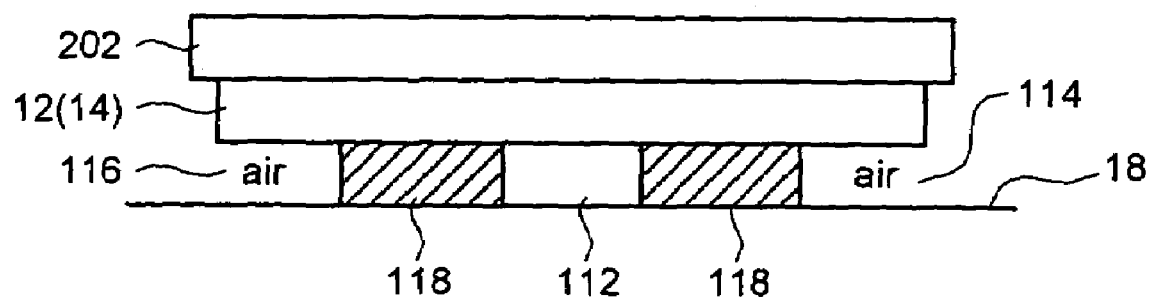

FIG. 19
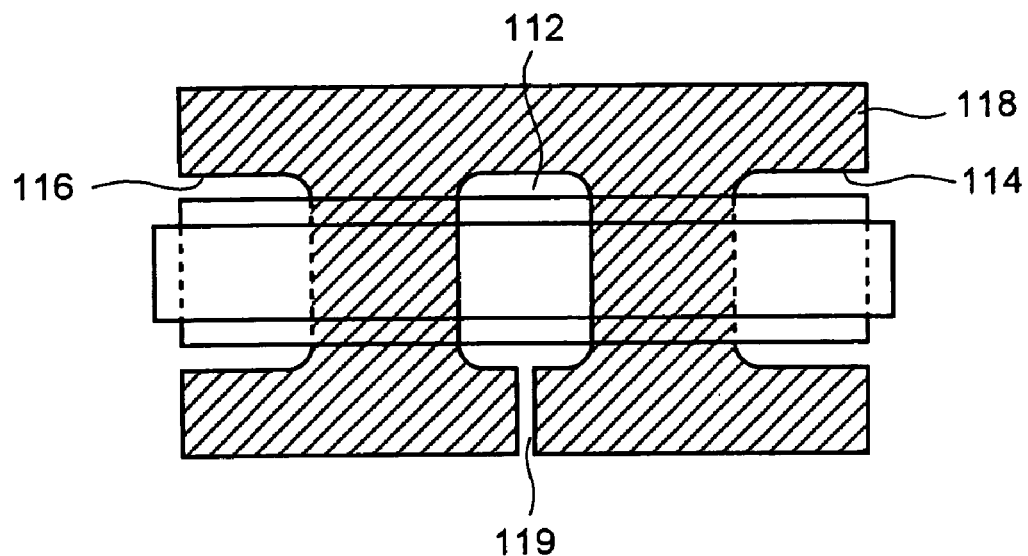
FIG. 20
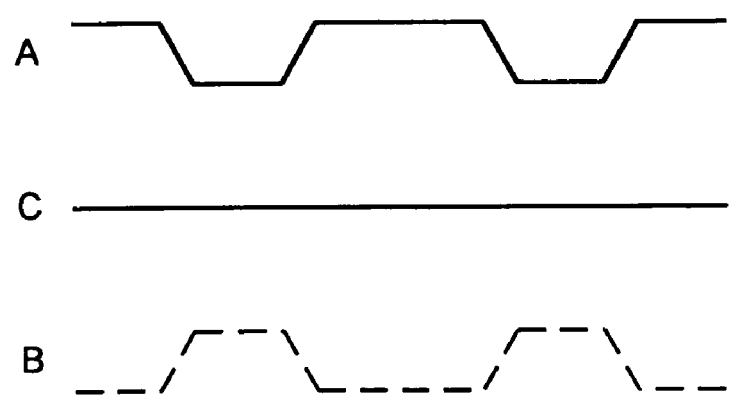
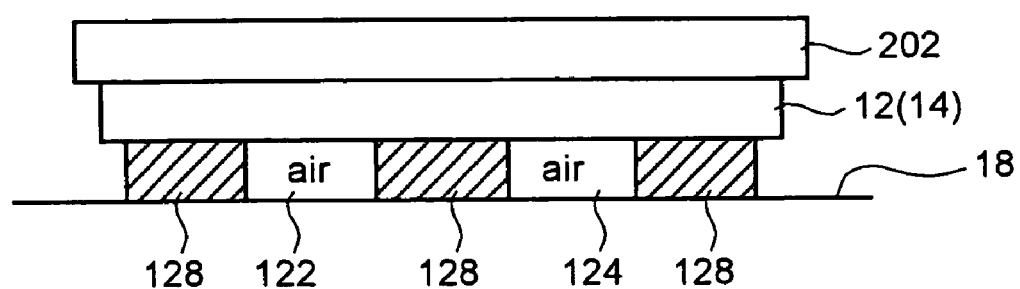

OPTICAL DEVICE MODULE

CROSS-REFERENCE TO RELATED APPLICATIONS

This application is based upon and claims the benefit of priority from the prior Japanese Patent Application No. 2003-362530, filed on Oct. 22, 2003, the entire contents of which are incorporated herein by reference.

BACKGROUND OF THE INVENTION

1) Field of the Invention

The present invention relates to an optical device module that homogenizes temperature distribution in optical devices, such as acousto-optic effect selection filters and arrayed waveguide grating filters, which are used in communication systems that employ wavelength-division multiplexing.

2) Description of the Related Art

If wavelength-division multiplexing (WDM) method is used in communication systems, the transmission capacity increases remarkably. Conventionally, in each node that carries out wavelength-division multiplexing, functions of adding and dropping optional wavelengths of light are essential. LiNbO3 waveguide type acousto-optic tunable filters (AOTF) that achieve these functions using acousto-optic effects are attracting attention. The advantage of the AOTF is that multiple wavelengths can be selected simultaneously or wide wavelength band exceeding 100 nanometer (nm) can be selected (see Optorics (1999) No. 5, P155 and The Institute of Electronics, Information and Communication Engineers, OPE 96-123, P79).

In addition, as optical devices for adding and dropping various optical signals, an optical waveguide grating (AWG), which uses an optical add/drop module array, is also included in main devices under examination. The advantage of the optical add/drop module array is that signal wavelength grids having intervals of 0.8 nm to 0.2 nm can be supported in the device.

(1) FIG. 27 illustrates a technique applied in a conventional optical device module (see Japanese Patent Application Laid-Open Publication No. 2001-330811). The AOTF 202 mentioned above includes x-cut LiNbO3 (lithium niobate) substrate 204, waveguide 206 formed by diffusing Ti (titanium) at high temperature by the Ti-diffusion method on LiNbO3 substrate 204, splines 208 formed at the positions on the light incoming side and light outgoing side on LiNbO3 substrate 204, interdigital transducer (IDT) 210 formed by patterning at the position in the light incoming side from the center, polarized beam splitter (PBS) 212 formed on LiNbO3 substrate 204 by the Ti-diffusion method, surface acoustic wave (SAW) guide 211 formed on waveguide 206, and SAW absorber 213.

In the AOTF 202, incoming light λ1 through λn are polarized and separated by PBS 212 and at the same time, polarized and synthesized by PBS 212 again. One beam is outputted to a split light port (not illustrated) as split light λ1 and the other is outputted to a transmitted light port (not illustrated) as transmitted light λ2 through λn. Moreover, incoming light of wavelength equivalent to the frequency of waveguide 206, that is, incoming light λ1 only is polarized and converted by transmitting waveguide 206 and outputted to the split light port.

(2) Japanese Patent Application Laid-Open Publication No. H8-146369 discloses a technique in which an acousto-optic filter includes a light waveguide for propagating single relative rectilinear polarized light, SAW generating means mounted on the optical waveguide for generating the SAW, and an interaction region which distributes a propagation loss of the SAW spatially and converts a specific wavelength component of the single relative rectilinear polarized light propagated in the light waveguide into rectilinear polarized light, which cross at right angles.

(3) Japanese Patent Application Laid-Open Publication No. H11-326855 discloses a method for adjusting filter wavelength characteristics by changing the shape and location of a strain-providing section after manufacturing an element with the strain providing section, for correcting local double refraction index of an optical waveguide.

(4) Japanese Patent Application Laid-Open Publication No. H9-49994 discloses a wavelength filter with an absorber for absorbing an SAW by each reflective electrode to the outside of the optical waveguide by forming the optical waveguide, and excitation electrodes for exciting the SAW on an acousto-optic crystal substrate and disposing reflective electrodes on propagation passage of the SAW.

(5) Japanese Patent Application Laid-Open Publication No. 2002-90563 discloses a waveguide type optical module, in which a heating/cooling element for controlling the temperature of the waveguide type optical element using a soaking plate and heat buffer layer, is installed on the temperature dependent waveguide type optical element and at least part of the soaking plate is brought into contact with the waveguide type element.

(6) On the other hand, Japanese Patent Application Laid-Open Publication No. 2000-249853 discloses an arrayed-waveguide grating that uses an optical add/drop module, as shown in FIG. 28, and that includes a waveguide chip (including, for example, optical substrate such as silicon, quartz, sapphire, etc.) 224 with arrayed waveguide (channel waveguide) 222 provided with optical add/drop functions on the surface, slab waveguide 226, and soaking plate 228 which bonds to the rear surface of waveguide chip 224 and soaks waveguide chip 224, wherein upper plate 230 for optical fiber connection is installed to the surface with arrayed waveguide 222 of waveguide chip 224 formed.

The AOTF 202 of LiNbO3 waveguide type according to (1) generally has heater 234 positioned with soaking plate 232, for example, copper plate, etc. intervened on the rear surface of x-cut LiNbO3 substrate 204 as shown in FIG. 29, and modularized in package (PKG) 236 together with this heater 234.

The heat conductivity in module construction of AOTF 202 can be assumed to be obtained by connecting heat resistance Rln of LiNbO3 substrate 204 as well as ambient (air) heat resistance Rair and heat resistance Rpkg of package 236 in parallel across current source I and external heat source (PKG incoming radiation) Ta as per thermal substrate 204 shown in FIG. 30 when package 236 is formed by material having comparatively high thermal conductivity.

This can be shown by the following mathematical expression:

$$Th = I \cdot ((Rpkg \cdot Rair)/(Rpkg + Rln + Rair)) + Ta \quad (1)$$

$$\Delta T = Th - Ta \quad (2)$$

$$\therefore I = \Delta T \cdot (1 + Rpkg/Rair + Rln/Rair)/Rpkg \approx \Delta T \cdot (1/Rpkg) \quad (3)$$

where Th is the temperature of LiNbO3 substrate 204.

Based on the above thermal conductivity, the temperature distribution of LiNbO3 waveguide type AOTF 202 is investigated. When the thermal conductivity is high, that is, Rpkg is small, soaking can take place, but (3) indicates that consumption power I of heater 234 increases as Rpkg decreases.

That is, even if soaking is carried out, the consumption power of heater 234 increases and it becomes unserviceable.

On the other hand, when package 236 is formed by material with low thermal conductivity (see FIG. 31), as is the case of the thermal equivalent circuit shown in FIG. 32A, across current source I and external heat source (PKG incoming radiation) Ta, heat resistance Rln0 of LiNbO3 substrate 204, and ambient heat resistance Rair0 are connected in parallel with heat resistance Rpkg of package 236. Heat resistance Rln1 of LiNbO3 substrate 204 and ambient heat resistance Rair1 in parallel with heat resistance Rpkg of package 236 are further connected in parallel after connecting center heat resistance Rspkg of package 236 across both parallel connections. At the same time, ambient heat resistance Rairout outside package 236 in communication with the ground is connected across heat resistance Rpkg of package 236 and ambient heat resistance Rair1.

This thermal equivalent circuit can be simplified to a circuit as shown in FIG. 32B in which heat resistance Rln0, heat resistance Rair0 of ambient in PKG, heat resistance Rpkg of LiNbO3 substrate 204, and heat resistance Rair1 of ambient in PKG are connected to center heat resistance Rspkg of package 236 in parallel across external heat source (PKG incoming radiation) Ta and heat resistance Rairout of ambient outside package 236.

This can be given by the following mathematical expression:

$$\Delta Tpkg = Ta \cdot Rc/(Rc + Rairout) \quad (4)$$

$$\Delta Ts = \Delta Tpkg \cdot Rln/(Rln + Rair) \quad (5)$$

where, $Rln0 = Rln1 = Rln \cdot \frac{1}{2}$ $Rair0 = Rair1 = Rair \cdot \frac{1}{2}$ $$\therefore \Delta Ts = (Rc/(Rc + Rairout)) \cdot (Rln/(Rln + Rair)) \cdot Ta \quad (6)$$

$$\Delta Ts = Ta \cdot (Rpkg/Rairout) \cdot (Rln/Rair)/((Rpkg/Rair + Rln/Rair + 1) + (1 + Rln/Rair) \cdot Rpkg/Rairout) \quad (7)$$

Now if Rln<<Rair or Rpkg<<Rairout,

ΔTs=0.

Based on the above thermal conductivity, the temperature distribution of LiNbO3 waveguide type AOTF 202 is investigated. In general, since Rln is not extremely smaller than Rair, Rpkg must be extremely smaller than air resistance Rairout, but this is not practical. Consequently, if package 236 is made of material with low thermal conductivity, and the external wall of package 236 is exposed to non-homogeneous outdoor temperature due to heat from an external heat source, the package is susceptible to non-uniformity of the outdoor temperature. Therefore, device (LiNbO3 substrate 204) surface temperature is likely to be non-uniform (temperature gradient is generated).

Analyzing from the heat equivalent circuit shown in FIG. 32B indicates that ΔTs, which is a temperature difference between both ends of a device, cannot be reduced unless heat resistance of package 236 is extremely smaller than air resistance outside the package. Consequently, when heat-insulating material is used for package 236, problems would occur when the external temperature is non-uniform.

Therefore, even if soaking plate 232 is used, temperature of the entire LiNbO3 substrate 204 cannot be homogenized. Moreover, temperature gradient is found on the surface of SAW guide 211 and stress is applied non-uniformly due to temperature gradient. Therefore, generation of crystal strain caused by acousto-optical effects cannot be prevented strictly, and filter characteristics degrade. In addition, this further causes a detrimental effect when multi-channeling is attempted, and subsequently, the total length and breadth of LiNbO3 substrate 204 and SAW guide 211 increase.

In (2), it is possible to make the attenuation coefficient of SAW 1.3 dB/cm and suppress side lobes satisfactorily by carrying out annealing treatment for a specified time. However, this is an insufficient configuration from the viewpoint of achieving a uniform temperature distribution, and characteristic problems as described above remain unsolved.

The conventional example according to (3) intends to adjust the filter wavelength characteristics by changing the shape and arrangement of a strain providing section after manufacturing an element with the strain providing section for correcting local double refraction index of an optical waveguide. However, from the viewpoint of providing uniform temperature and achieving strain correction, it requires extra cost and impairs simplicity from the viewpoint of manufacture. Furthermore, it is extremely difficult to correct the difference in refraction index appropriately, in order to obtain completely satisfactory filter characteristics.

In the conventional examples described in (1) through (4), various techniques are described for improving characteristics as a device unit, but these methods do not consider any measures against heat when they are modularized. Particularly, these methods do not take into account generation of temperature gradient, and cannot solve the problem in the case of achieving multi-channeling in which a plurality of AOTF are positioned on one LiNbO3 substrate. As described in (4), it is well known that the filter characteristics of AOTF degrade when temperature distribution is present on the surface of the SAW guide. This is because when stress is applied non-uniformly due to temperature distributions, crystal strain due to acousto-optic effects becomes non-uniform and the filter characteristics degrade. Consequently, it becomes difficult to make the temperature in the SAW guide uniform. Furthermore, when multi-channeling is achieved, not only length but also width of the AOTF device increases, and it becomes still more difficult to achieve uniform temperature on the device surface.

The conventional examples described in (5) and (6) describe a soaking structure in a waveguide device. In these examples, a soaking plate made of a metal with excellent thermal conductivity is inserted between AWG waveguide device and temperature control device (heater, Peltier device). In the case of an AOTF device different from AWG, since the device area is large, there is a temperature gradient of the heater itself and temperature gradient due to heat resistance difference of air on the AOTF device surface. Therefore, the desired temperature uniformity cannot be achieved by this kind of soaking plate alone. That is, with such construction, a heat soaking plate is placed only on the Peltier device and though the temperature is made homogeneous, outside effects are not considered. In addition, if the heat soaking plate that provides good thermal conductivity is provided, consumption power increases.

In the optical add/drop modules that use an AWG device, described in (6), lengths of adjoining waveguides in the channel waveguides vary slightly and slab waveguide are formed on an optical substrate such as silicon, quartz, sapphire, etc. (see "FIG. 1" of Japanese Patent Application Laid-Open Publication No. 2000-249853). In this kind of waveguide type device, temperature distribution deviates the light path from the designed value due to temperature dependency of refraction index. In addition, in this waveguide type device, as the number of channels increases, the device area expands; and a construction that does not generate temperature distribution becomes indispensable.

Thus, the device area in AOTF devices is large. Therefore, problems such as temperature gradient of the heater and temperature gradient caused by difference in heat resistance on the device surface, etc. occur. Therefore, in AOTF devices, the use of the heat soaking plate alone cannot achieve the temperature uniformity in the device. On the other hand, in AWG devices, because the device area increases with the number of channels, temperature uniformity cannot be achieved in the device.

SUMMARY OF THE INVENTION

It is an object of the invention to at least solve the problems in the conventional technology.

An optical device module according to an aspect of the present invention includes an optical device; a soaking unit fixed to one surface of the optical device; a heating/cooling unit fixed to one surface of the soaking unit, wherein the heating/cooling unit performs a function selected from a group consisting of heating the optical device using self-generated heat and cooling the optical device by absorbing heat; a heat-insulating unit fixed to one surface of the heating/cooling unit; and a package that houses the optical device, the soaking unit, the heating/cooling unit, and the heat-insulating unit. The heat-insulating unit is fixed to one surface of the package.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 11 illustrates an essential portion viewed from the bottom surface of an optical device module according to a seventh embodiment;

FIG. 12 is a side view of an optical device module according to an eighth embodiment, and an example of temperature characteristics;

FIG. 15 illustrates results of computer simulation of temperature distribution in an optical device by the optical device module;

FIG. 16 is a side view of an essential portion of an optical device module according to a ninth embodiment, and an example of temperature characteristics;

FIG. 17 illustrates the essential part viewed from the bottom surface of an optical device module;

FIG. 18 is a side view of an essential portion of an optical device module according to a tenth embodiment, and an example of temperature characteristics;

FIG. 19 illustrates the essential part viewed from the bottom surface of the optical device module;

FIG. 20 is a side view of an essential portion of an optical device module according to an eleventh embodiment, and an example of temperature characteristics;

DETAILED DESCRIPTION

Exemplary embodiments of an optical device module according to the present invention will be explained in detail with reference to the accompanying drawings.

Figure 27:
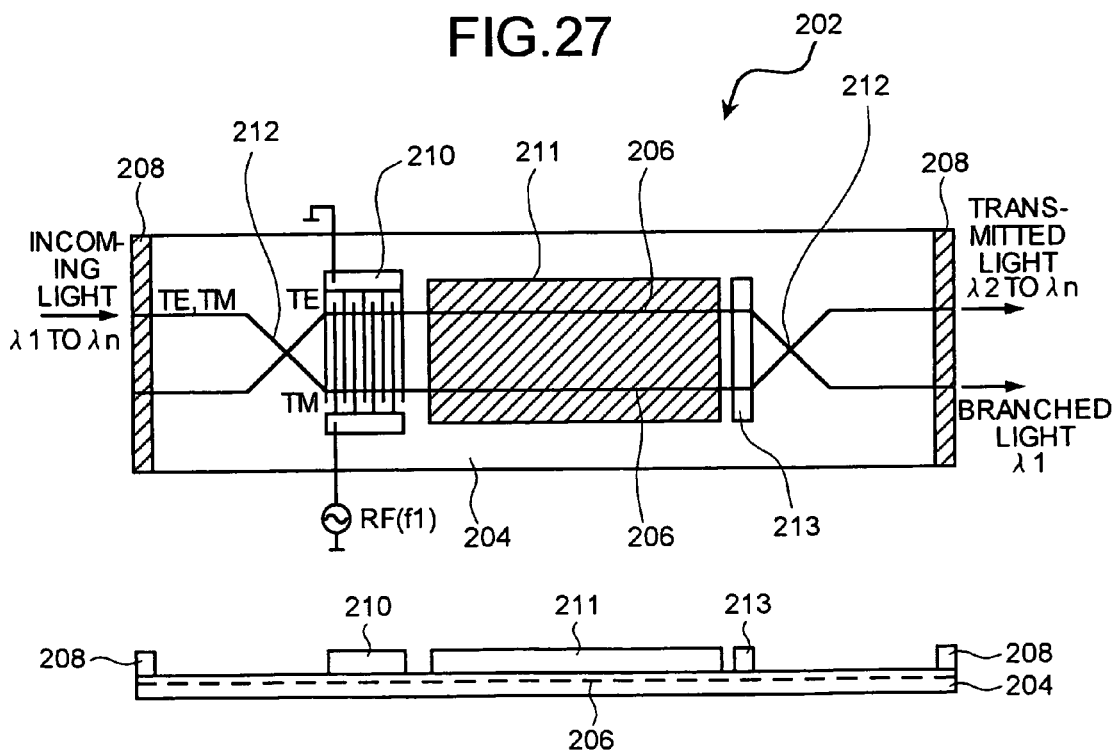
FIG. 27 illustrates a first example of a conventional optical device module.
Figure 28:
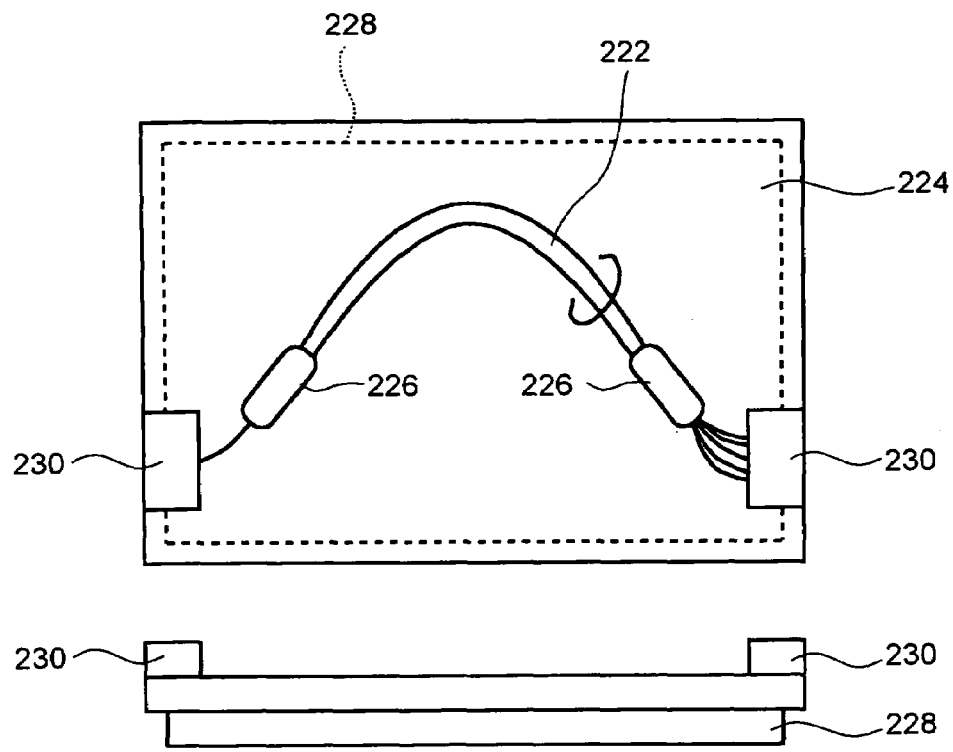
FIG. 28 illustrates a second example of a conventional optical device module.
Figure 29:
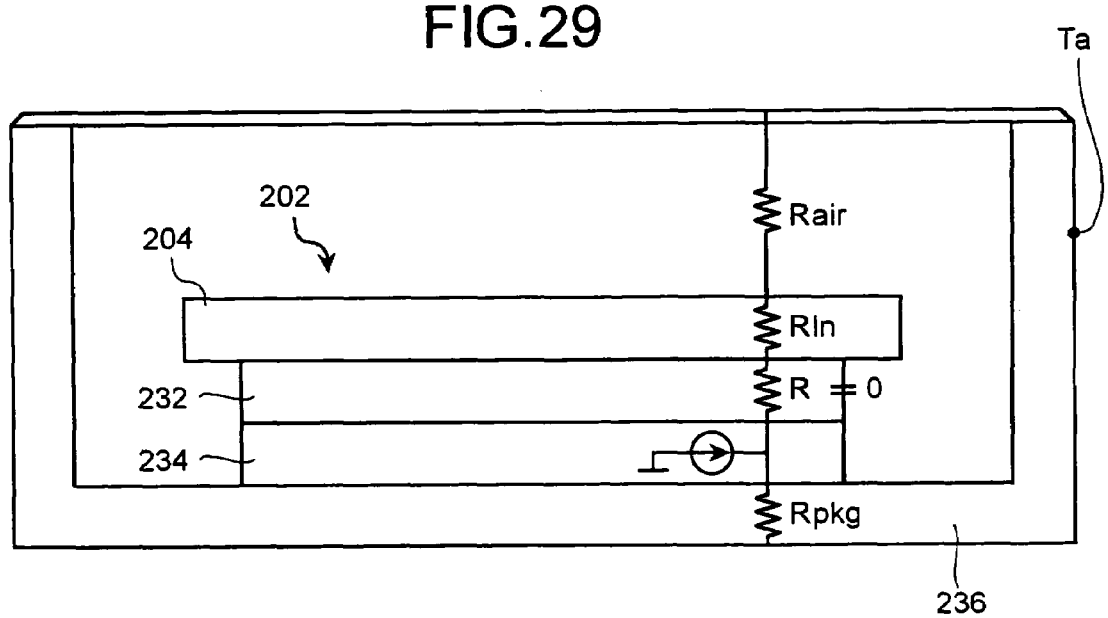
FIG. 29 illustrates heat resistance of each section in the first conventional optical device module.
Figure 30:
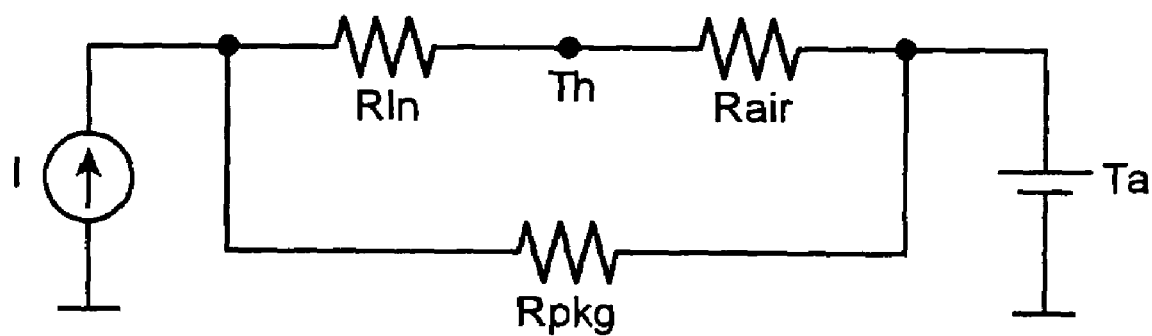
FIG. 30 is a circuit diagram illustrating heat resistance of each section in the first conventional optical device module.
Figure 31:
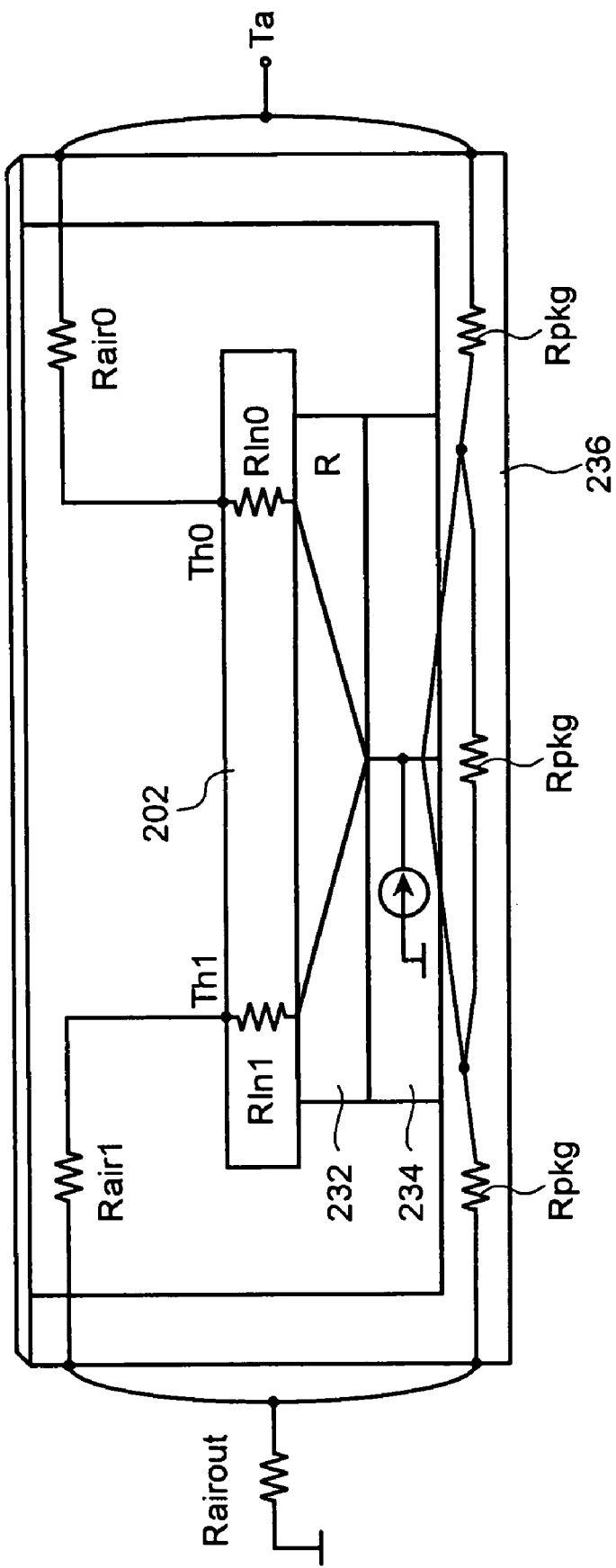
FIG. 31 illustrates heat resistance of each section in the first conventional optical device module when the package has low thermal conductivity.
Figure 32A:
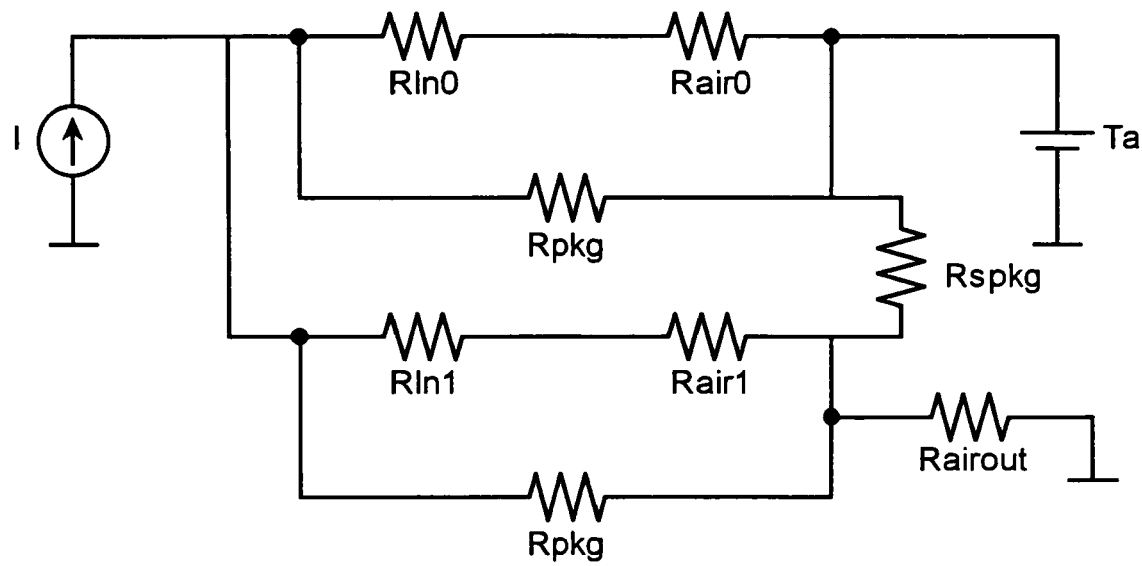
FIG. 32A is a thermal equivalent circuit diagram illustrating heat resistance of the module shown in FIG. 31.
Figure 32B:
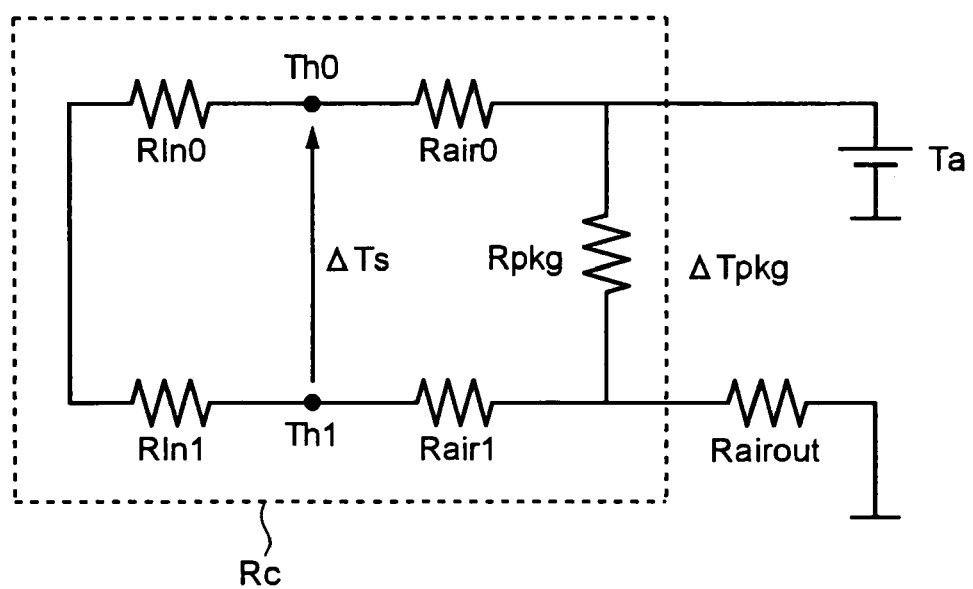
FIG. 32B illustrates a simplified form of the thermal equivalent circuit.

Referring to drawings, an optical device module related to embodiments 1 through 15 of the present invention is described in detail. A case in which LiNbO3 waveguide type AOTF 202, which is a waveguide type optical device shown in FIG. 27, is applied is described as an example of the optical device. Thereafter, the detailed description of the AOTF 202 is omitted.

Figure 1:
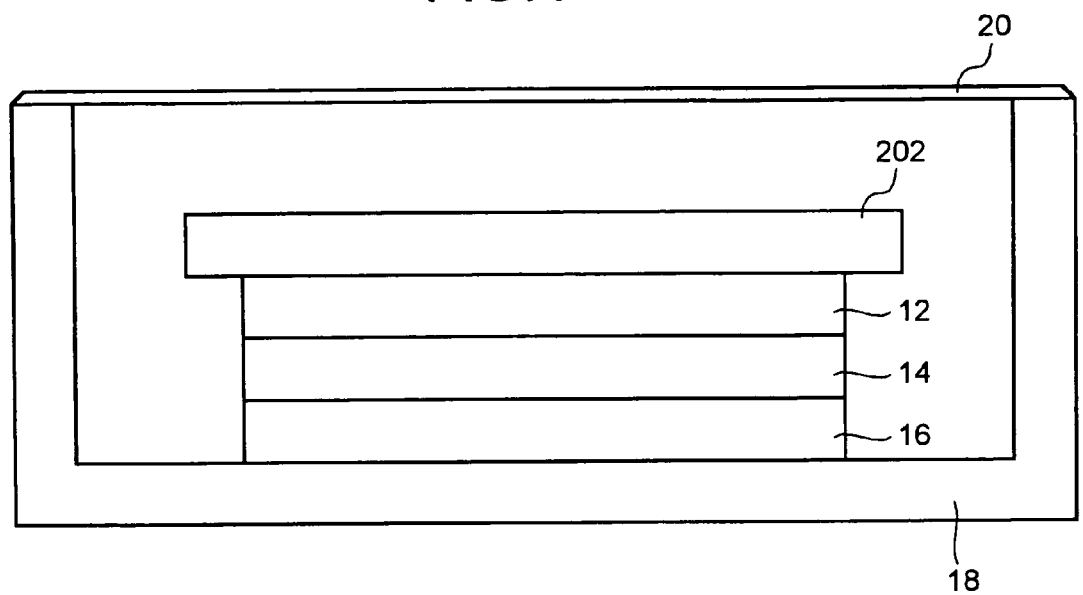
FIG. 1 is a side view of an optical device module according to a first embodiment of the present invention.

FIG. 1 is a side view of an optical device module according to a first embodiment of the present invention. A flat-plate form soaking plate (soaking member) 12 of uniform thickness made of material having good heat conductivity such as copper is joined to the bottom surface of AOTF 202 using an adhesive such as epoxy resin. A heater (temperature control section) 14 that has a cubic form, generates heat in accordance with the supply of electric current and is joined to the bottom surface of soaking plate 12 using an adhesive such as epoxy resin. A heat-insulator (heat-insulating means: heat-insulating element) 16 is made of polyphenylene sulfide (PPS), Duracon, or phenol resin, among others and is joined to the bottom surface of heater 14 using an adhesive such as epoxy resin. A top profile of the heat-insulator 16 coincides with the bottom profile of soaking plate 12. Similarly, the bottom surface of heat-insulator 16 is joined to the inner bottom surface of a package (PKG) 18 using adhesive such as epoxy resin. The table below shows thermal conductivity of these components.

| Name | Heat conductivity (W/m-° C.) |
|---|---|
| PPS | 0.26 |
| Duracon | 0.30 |
| Phenol resin | 0.21 |

By joining the bottom surface of heat insulator 16 to the inside of package 18, a successively laminating configuration to integrate AOTF 202, soaking plate 12, heater 14, and heat insulator 16, is housed in package 18. The package 18 is made of material having good heat conductivity and is formed into an airtight cube (hollow cubic form) shut with lid 20.

In place of heater 14, a Peltier element may be used, and in such case, the top surface of the Peltier element is used for heating and the bottom surface for absorbing heat. In addition, in FIG. 1, the area of the top surface and the bottom surface of soaking plate 12, heater 14, and heat insulator 16 are smaller than the area of the bottom surface of AOTF 202, but these may be assumed to be identical.

In the first embodiment, when heater 14 is heated, the soaking plate 12 and AOTF 202 are heated. The heat insulator 16 prevents transmission of the heat downwards and almost all of the heat is transmitted upwards to soaking plate 12, thereby efficiently and uniformly heating the soaking plate 12.

Figure 2:
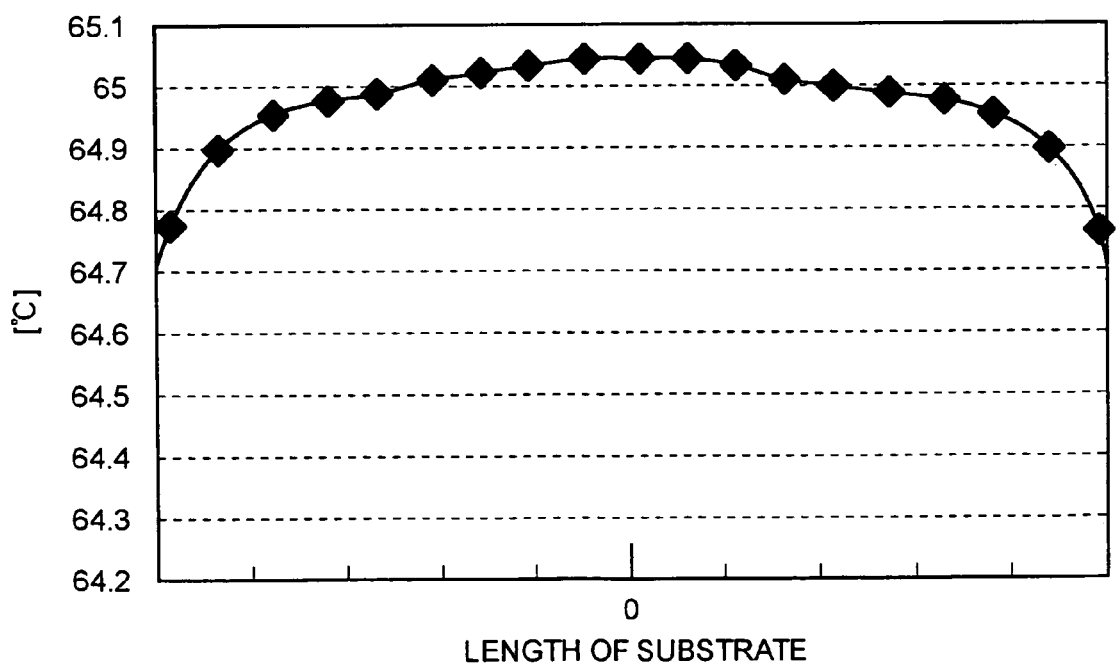
FIG. 2 illustrates results of computer simulation of temperature distribution in an optical device by the optical device module.

FIG. 2 illustrates results of computer simulation of temperature distribution in an optical device by the optical device module. An overall temperature distribution of 0.3° C. or lower is obtained.

Figure 3:
FIG. 3 is a side view of an optical device module according to a second embodiment.

An optical device module according to a second embodiment is described below with reference to FIG. 3 through FIG. 5. FIG. 3 is a side view of an optical device module according to a second embodiment. The configuration of the heat-insulating means is explained in detail. The other components of the optical device module are identical to those in the first embodiment, and the detailed description thereof is omitted.

Figure 4:
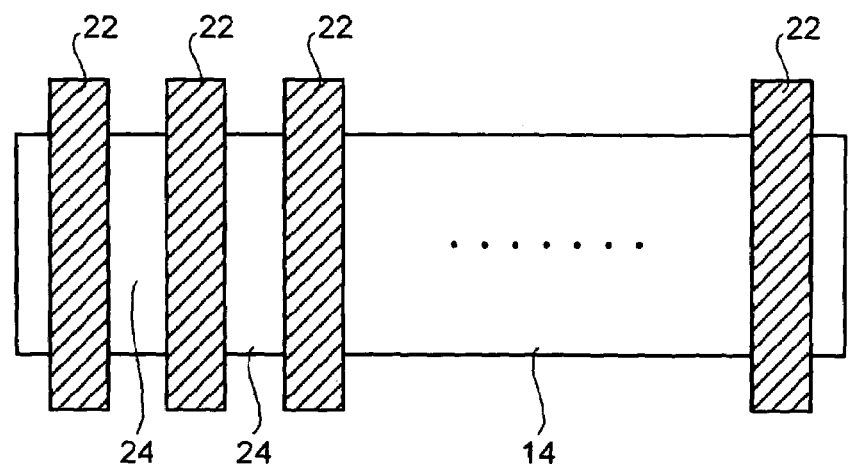
FIG. 4 is a view of the optical device module as seen from the bottom surface.

FIG. 4 is a view of the optical device module as seen from the bottom surface. As shown in FIG. 3 and FIG. 4, the heat insulating means includes a plurality of heat-insulating elements in the form of square bars that are made of polyphenylene sulfide, Duracon, or phenol resin. The heat-insulating elements have varying heat-insulation ratio (thermal conductivity) and are spaced at predetermined intervals, perpendicular to the direction of propagation of incoming lights λ1 through λn. One surface of the heat-insulating elements is attached to the bottom surface of heater 14 and the other surface to the inner bottom surface of package 18. The length of each of the square-bars of the heat insulator 22 is slightly longer than the breadth of the AOTF 202. Consequently, it becomes easy to position the heat insulator 22 on the heater 14 or the heater 14 on a plurality of heat insulators 22. Spatial regions 24 are present between the squared bars of the heat insulator 22. The air inside the package 18, which fills the spatial regions 24 serves as an additional heat-insulating element. It is well known that the heat-insulation ratio of air is higher than that of the heat insulator 22.

With this configuration, when heater 14 is heated, the temperature of the portion of the heater 14 heat-insulated by air inside each spatial region 24 increases, making the temperature of the corresponding portions of soaking plate 12 relatively higher.

Figure 5:
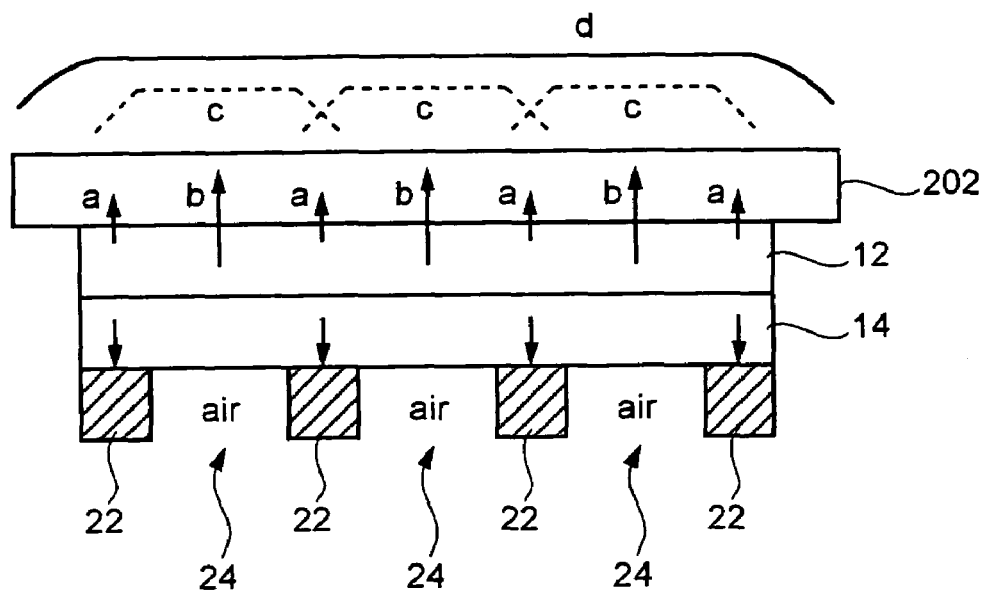
FIG. 5 is a side view of the optical device module, explaining how heating temperature is transmitted.

FIG. 5 is a side view of the optical device module, explaining how heating temperature is transmitted. As shown with arrow marks in the figure, the portion of the soaking plate 12 corresponding to the portion where heat insulator 22 exists, reaches a temperature level "a". The portion of the soaking plate 12 corresponding to the portion of spatial region 24 reaches the temperature of level "b", which is higher than level "a". On the surface of AOTF 202, a plurality of arc-shaped regions of temperature level "c" is formed, each centered around the temperature level b. As time passes, the entire surface of the AOTF 202 is assumed to reach a uniform temperature level "d". In other words, the same results as shown in FIG. 2 can be obtained.

According to the second embodiment, spatial regions 24 of air insulation are interleaved between heat insulators 22. Therefore, the heating temperature of the whole of heater 14 can be transmitted efficiently to soaking plate 12, thereby saving energy and at the same time, reducing the volume of the material used for the heat insulators. Consequently, keeping the surface temperature of the AOTF 202 uniform further reduces cost. Moreover, the AOTF 202 exhibits satisfactory filter characteristics, and it becomes easy to promote multi-channeling and increase the functionality.

Figure 6:
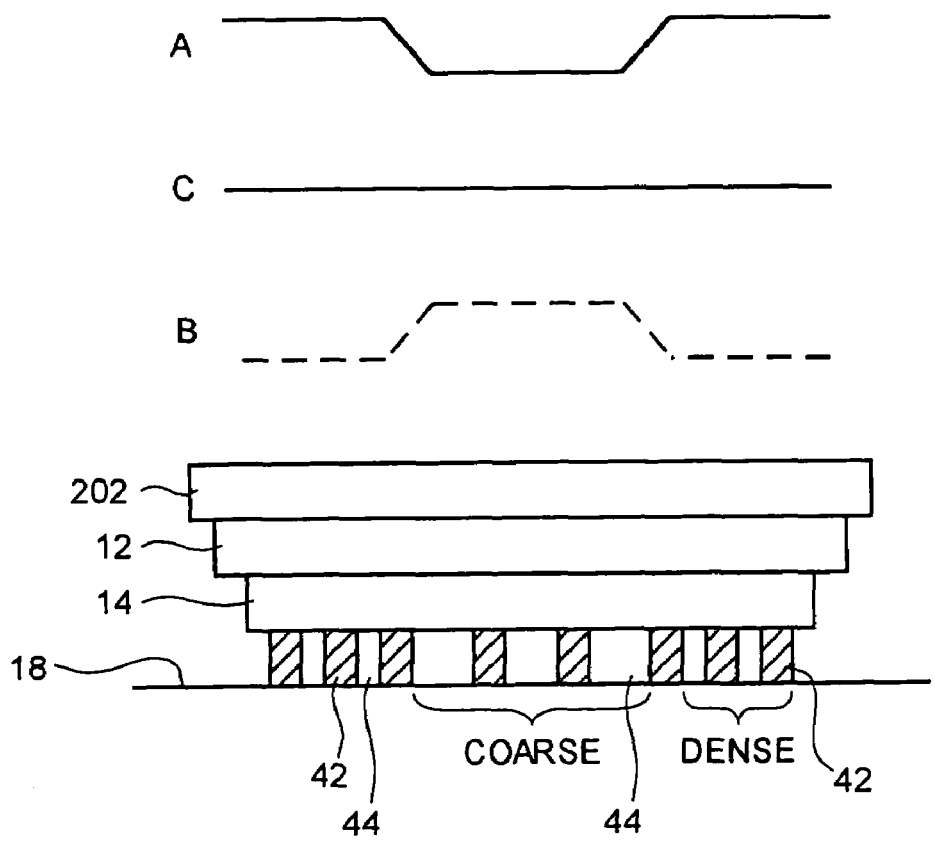
FIG. 6 is a side view of an essential portion of an optical device module according to a third embodiment, and an example of temperature characteristics.
Figure 7:
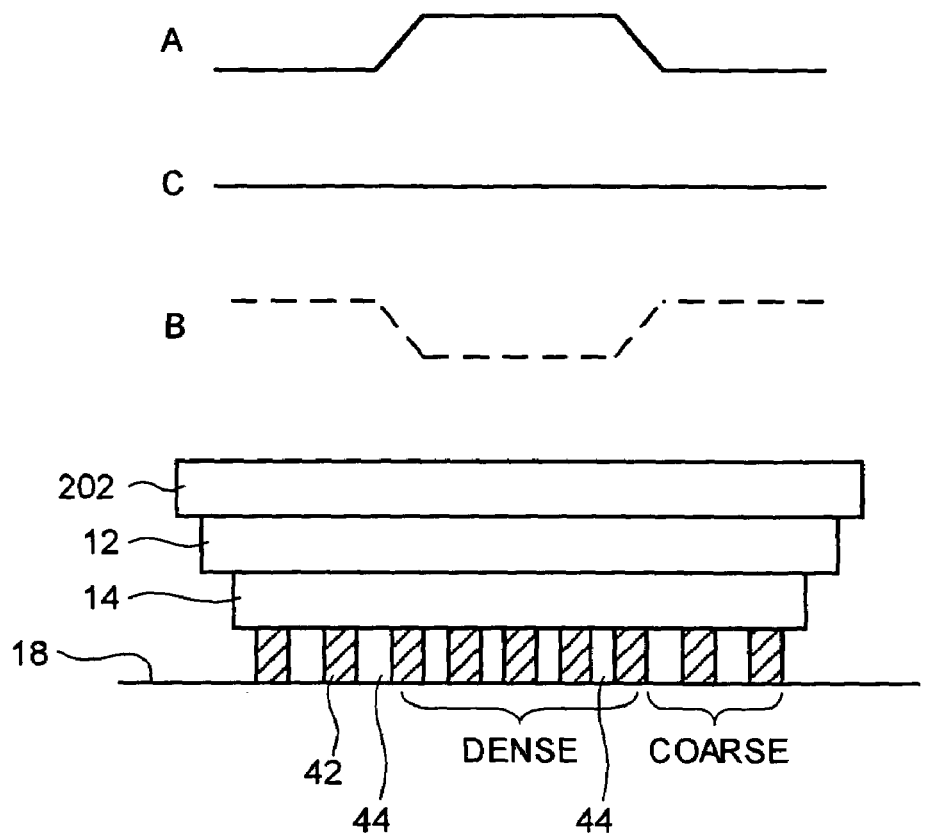
FIG. 7 is a side view of an essential portion of an optical device module according to a third embodiment, and another example of temperature characteristics.

An optical device module according to a third embodiment 3 is described next, with reference to FIG. 6 and FIG. 7. FIG. 6 is a side view of essential portion of the optical device module according to the third embodiment, together with temperature characteristics. FIG. 7 is a side view of the essential portion, and another example of temperature characteristics. In the case of embodiment 3, the configuration of the heat insulating means is explained in detail. The other components of the optical device module are identical to those in the first and second embodiments, and the detailed description thereof is omitted.

In the third embodiment, the heat insulating means is formed by a plurality of square bars (heat insulating elements) 42 identical in shape, made of polyphenylene sulfide, Duracon, or phenol resin, etc., and attached to the bottom surface of heater 14. A plurality of spatial regions 44 providing air heat insulation are formed between the square bars. The heat insulators 42 are placed in a direction perpendicular to the direction of propagation of the incoming light. However, unlike in the second embodiment, the space between the plurality of heat insulators 42 is not identical, the spatial regions 44 are coarse or densely spaced. Moreover, each of the heat insulators 42 is joined to the inner bottom surface of package 18 by adhesive such as epoxy resin, etc.

Sometimes, the temperature of the center of heater 14 is likely to be lower than that of the other regions, as seen from temperature characteristics of heat-generating resistors in heater 14 (concave temperature distribution due to non-uniformity of the heater: see pattern A in FIG. 6). The region where the intervals between the heat insulators 42 are coarse corresponds to the center region of heater 14, and the region where the intervals between the heat insulators 42 are dense corresponds to the regions on both ends of the heater 14. When the heater 14 is heated, the total heat insulation provided by the coarse regions of heat insulator 42 is large. Therefore, the temperature of the coarse regions is comparatively high (convex temperature distribution due to heat insulator: see pattern B in FIG. 6) and mutually compensates for the concave temperature distribution of heater 14, thereby homogenizing the temperature distribution of the AOTF 202 (see pattern C in FIG. 6).

On the other hand, sometimes, the temperature of the center of heater 14 is likely to be higher than that of the other regions, as seen from temperature characteristics of heat-generating resistors in heater 14 (convex temperature distribution due to non-uniformity of the heater: see pattern A in FIG. 7). The region where the intervals between the heat insulators 42 are coarse corresponds to the region on both ends of heater 14, and the region where the intervals between the heat insulators 42 are dense corresponds to the center region of heater 14. When heater 14 is heated, the total heat insulation provided by the coarse region of heat insulator 42 is large. Therefore, the temperature of the coarse region is comparatively high (concave temperature distribution due to heat insulator: see pattern B in FIG. 7) and mutually compensates for the convex temperature distribution of heater 14, thereby homogenizing the temperature distribution of the AOTF 202 (see pattern C in FIG. 7).

Thus, according to the third embodiment, the coarse and dense regions between the heat insulators 42 are configured based on the temperature distribution characteristics of the heater 14. Therefore, the temperature distribution of the soaking plate 12 can be homogenized appropriately, and the entire region of AOTF 202 can be uniformly heated. Moreover, merely by adjusting the intervals between the heat insulators 42 to be either coarse or dense, it is possible to keep the surface temperature of AOTF uniform. Consequently, cost is reduced, satisfactory filter characteristics of AOTF are exhibited and maintained, and at the same time, multi-channeling can be promoted and functionality increases. Furthermore, because the heat insulators 42 have spatial regions 44 for communication with the inside of package 18, air inside each spatial region 44 can be evacuated. Consequently, air inside each of the spatial regions 44 does not expand and excellent heat insulating effects are achieved.

The technique of adjusting the intervals of insulators 42 into coarse regions and dense regions can be applied to embodiment 1 and embodiment 2 described above.

Figure 8:
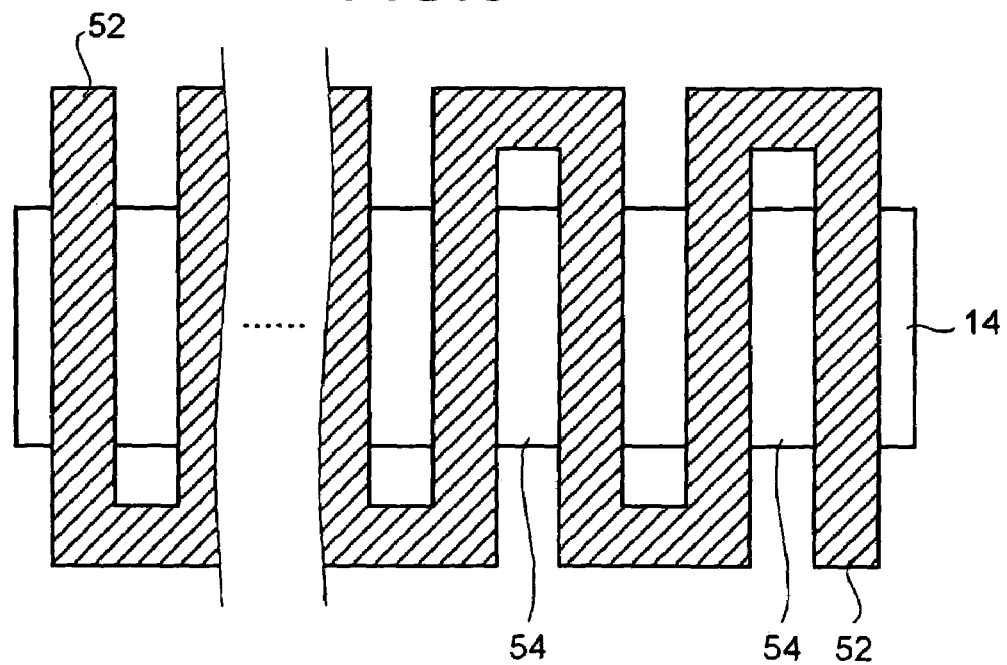
FIG. 8 illustrates an essential part viewed from the bottom surface of an optical device module according to a fourth embodiment.

An optical device module according to a fourth embodiment is described next, with reference to FIG. 8. FIG. 8 illustrates an essential portion viewed from the bottom surface of the optical device module according to a fourth embodiment. The configuration of the heat-insulating means is explained in detail. The other components of the optical device module are identical to those in the first embodiment, and the detailed description thereof is omitted.

As shown in FIG. 8, the heat insulating means includes heat-insulating elements 52 with identical cross sections and made of polyphenylene sulfide, Duracon, or phenol resin, etc. The heat-insulating elements 52 are meandrous and form spatial regions 54 for air heat insulation. The spatial regions 54 are spaced at predetermined intervals perpendicular to the direction of propagation of incoming light. Thus, the heat insulators 52 cut across the bottom surface of heater 14, are connected on alternate ends, and are integrated into one piece. The meandering heat insulators 52 are joined to the bottom surface of heater 14 and to the inner bottom surface of package 18 (see FIG. 1) by adhesive such as epoxy resin.

Thus, in the fourth embodiment, the use of meandering heat insulators 52 simplifies production and positioning of the heater 14 and heat insulators 52. Consequently, fabrication is simplified. Moreover, the temperature distribution of soaking plate 12 can be homogenized appropriately, and the entire region of the AOTF 202 can be uniformly heated. Furthermore, satisfactory filter characteristics of AOTF are exhibited and maintained, and at the same time, multi-channeling can be promoted and functionality increases. Because heat insulators 52 have spatial regions 54 to communicate with the inside of package 18, air inside each spatial region 54 can be evacuated. Consequently, the air inside each of spatial regions 54 does not expand and excellent heat insulating effects are achieved.

The intervals between meandering heat insulators 52, that is the spatial regions 54 for air heat insulation may be configured to have coarse regions and dense regions based on the heating characteristics of heater 14.

Figure 9:
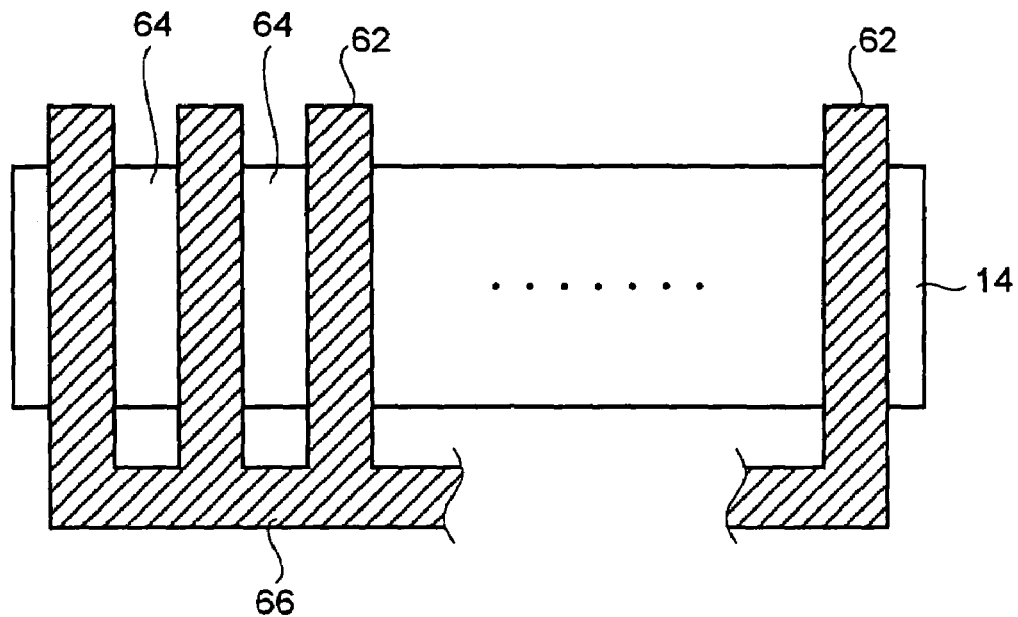
FIG. 9 illustrates an essential portion viewed from the bottom surface of an optical device module according to a fifth embodiment.

An optical device module according to a fifth embodiment is described next, with reference to FIG. 9. FIG. 9 illustrates an essential portion viewed from the bottom surface of the optical device module according to the fifth embodiment. The configuration of the heat insulating means is explained in detail. The other components of the optical device module are identical to those in the first embodiment, and the detailed description thereof is omitted.

As shown in FIG. 9, the heat insulating means includes a plurality of heat-insulating elements 62 with identical cross sections and made of polyphenylene sulfide, Duracon, or phenol resin, etc. The heat-insulating elements 62 are provided in a form of comb teeth while forming spatial regions 64 for air heat insulation. The spatial regions 64 are spaced at predetermined intervals perpendicular to the direction of propagation of incoming light. Consequently, the heat insulators 62 cut across the bottom surface of heater 14, are connected to heat insulator 66 on one end, and are integrated into one piece. The comb-teeth shaped heat insulators 62 are joined to the bottom surface of heater 14 and to the inner bottom surface of package 18 (see FIG. 1) by adhesive such as epoxy resin.

Thus, in the fifth embodiment, the use of comb-teeth shaped heat insulators 62 simplifies production and positioning of the heater 14 and heat insulators 62. Consequently, fabrication is simplified. Moreover, the temperature distribution of soaking plate 12 can be homogenized appropriately, and the entire region of the AOTF 202 can be heated uniformly. Furthermore, satisfactory filter characteristics of AOTF are exhibited and maintained, and at the same time, multi-channeling can be promoted and functionality increases. Because comb-teeth shaped heat insulators 62 have spatial regions 64 to communicate with the inside of package 18, air inside the spatial region 64 can be evacuated, and consequently, air inside each of spatial regions 64 does not expand and excellent heat insulating effects are achieved.

The intervals between comb-teeth shaped heat insulators 62, that is the spatial regions 64 for air heat insulation may be configured to have coarse regions and dense regions based on the heating characteristics of heater 14.

Figure 10:
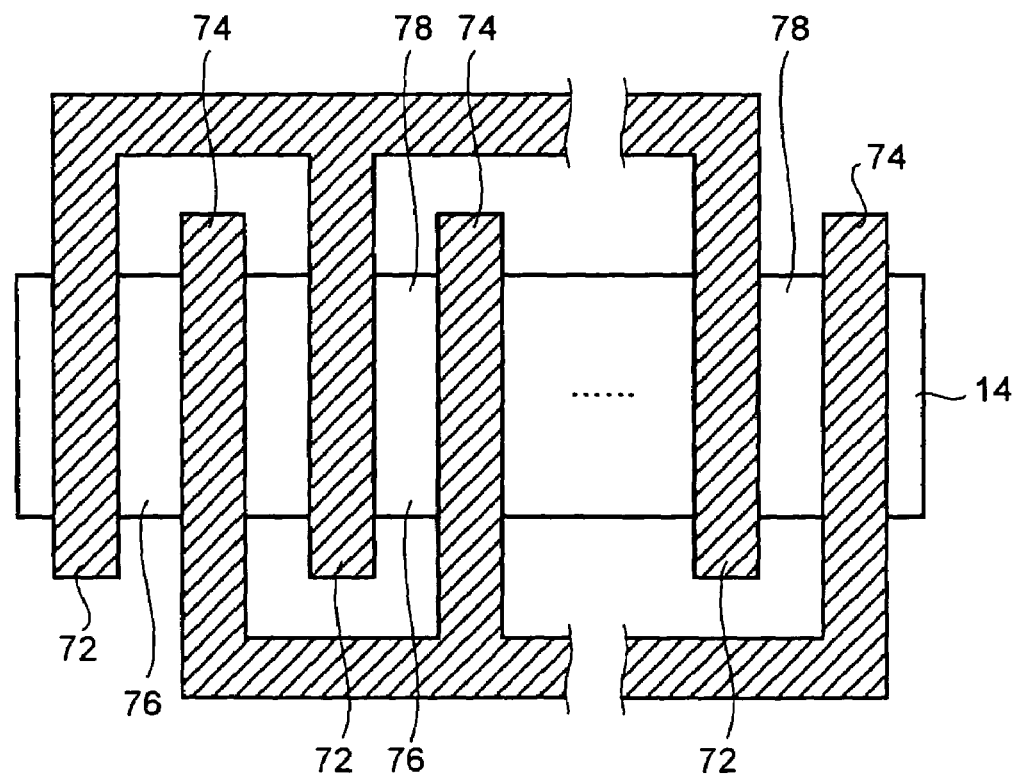
FIG. 10 illustrates an essential portion viewed from the bottom surface of an optical device module according to a sixth embodiment.

An optical device module according to a sixth embodiment is described next, with reference to FIG. 10. FIG. 10 illustrates an essential portion viewed from the bottom surface of the optical device module according to the sixth embodiment. The configuration of the heat insulating means is explained in detail. The other components of the optical device module are identical to those in the first embodiment, and the detailed description thereof is omitted.

As shown in FIG. 10, the heat insulating means is formed by one pair of heat insulators, each including a plurality of heat-insulating elements 72, 74 with identical cross sections and made of polyphenylene sulfide, Duracon, or phenol resin, etc. The heat-insulating elements 72, 74 are provided in a form of comb teeth while forming spatial regions 76, 78 for air heat insulation. The spatial regions 76, 78 are spaced at predetermined intervals perpendicular to the direction of propagation of incoming light. The comb-teeth shaped insulators 72 are interleaved with the comb-teeth-form insulators 74 so that the plurality of elements of one insulator is placed in the spatial regions of the other insulator. The two comb-teeth-form insulators 72, 74 are joined to the bottom surface of heater 14 and to the inner bottom surface of package 18 (see FIG. 1) by adhesive such as epoxy resin, etc.

Thus, in the sixth embodiment, the use of comb-teeth shaped heat insulators 72, 74, which are interleaved, simplifies production and positioning of the heater 14 and the two comb-teeth shaped heat insulators 72, 74. Consequently, fabrication is simplified. Moreover, the temperature distribution of soaking plate 12 can be homogenized appropriately, and the entire region of the AOTF 202 can be heated uniformly. Furthermore, satisfactory filter characteristics of AOTF are exhibited and maintained, and at the same time, multi-channeling can be promoted and functionality increases. Furthermore, because comb-teeth shaped heat insulators 72, 74 have spatial regions 76, 78 for communication with the inside of package 18, air inside the spatial regions 76, 78 can be evacuated. Consequently, the air inside each of spatial regions 76, 78 does not expand and excellent heat insulating effects are achieved.

The intervals between comb-teeth shaped heat insulators 72, 74, that is, the spatial regions 76, 78 for air heat insulation may be configured to have coarse regions and dense regions based on the heating characteristics of heater 14.

An optical device module according to a seventh embodiment is described next, with reference to FIG. 11. FIG. 11 illustrates an essential portion viewed from the bottom surface of the optical device module according to the seventh embodiment. The configuration of the heat insulating means is explained in detail. The other components of the optical device module are identical to those in the first embodiment, and the detailed description thereof is omitted.

As shown in FIG. 11, the heat insulating means is formed by a plurality of plate-form heat-insulating elements 84, is made of polyphenylene sulfide, Duracon, or phenol resin, etc. and placed perpendicular to the direction of propagation of incoming light. A plurality of spatial regions 82 may be formed by injection and hollowing, (the forming method is optional) for air insulation. The spatial regions 82 are spaced at predetermined intervals perpendicular to the direction of propagation of incoming light. An air vent 86 that enables ventilation of each of spatial regions 82 is formed on one end of each heat insulating plate. Each of these heat insulators 84 is joined to the bottom surface of heater 14 and to the inner bottom surface of package 18 (see FIG. 1) by adhesive such as epoxy resin, etc.

Thus, in the seventh embodiment, the use of heat-insulator plate 84 simplifies production and positioning of the heater 14 and heat insulators 84. Consequently, fabrication is simplified. Moreover, the temperature distribution of soaking plate 12 can be homogenized appropriately, and the entire region of the AOTF 202 can be heated uniformly. Furthermore, satisfactory filter characteristics of AOTF are exhibited and maintained, and at the same time, multi-channeling can be promoted and functionality increases. Furthermore, because heat insulator 84 has air vent 86 at one end of each of spatial regions 82 for communication with the inside of package 18, air inside each of spatial regions 82 can be evacuated. Consequently, air inside spatial regions 82 does not expand and excellent heat insulating effects are achieved.

The intervals between the spatial regions 82 may be configured to have coarse regions and dense regions based on the heating characteristics of heater 14.

Figure 13:
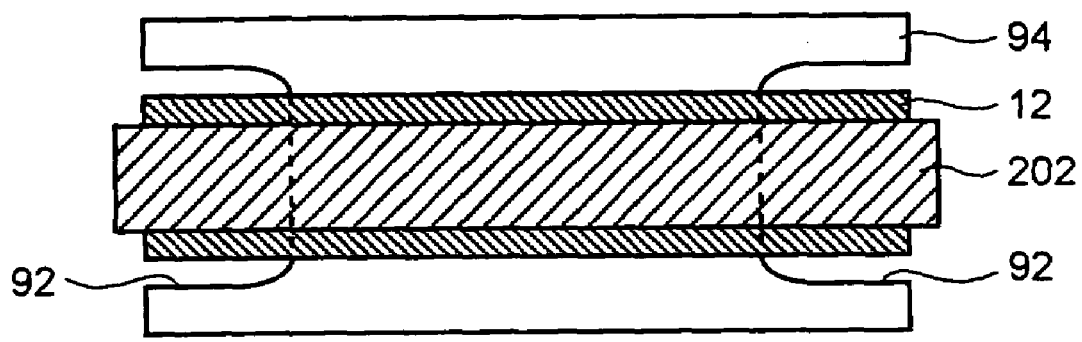
FIG. 13 illustrates an essential part viewed from the bottom surface of an optical device module according to an eighth embodiment.
Figure 14:
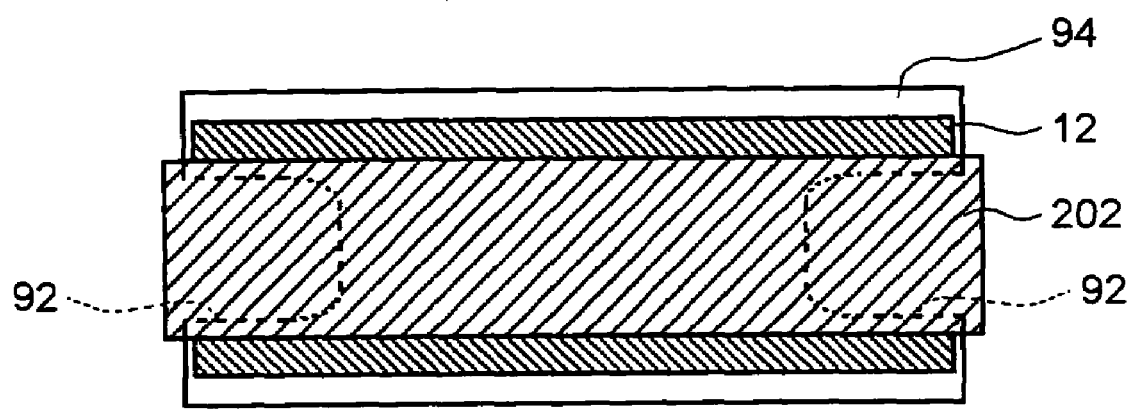
FIG. 14 illustrates a variation of the essential part viewed from the bottom surface of the optical device module.

An optical device module according to an eighth embodiment is described next, with reference to FIG. 12 through FIG. 15. FIG. 12 is a side view an essential portion of the optical device module of the eighth embodiment together with temperature characteristics. FIG. 13 and FIG. 14 are views as seen from the bottom surface. The configuration of the heat insulating means is explained in detail. The other components of the optical device module are identical to those in the first embodiment, and the detailed description thereof is omitted.

As shown in FIG. 13, the heat insulating means made of polyphenylene sulfide, Duracon, or phenol resin, etc., is in the form of letter X and is a flat-plate heat insulating element 94 having recessed sections 92, 92 for air heat insulation (heat insulating element). Both ends are depressed in the concave shape in order to deal with the case in which the center of heater 14 tends to acquire comparatively high temperature due to patterns of heat-generating resistors inside heater 14 (convex temperature distribution due to non-uniformity of the heater: see pattern A in FIG. 12). The X-shaped heat insulator 94 is joined to the bottom surface of heater 14 and to the inner bottom surface of package 18 by adhesive such as epoxy resin, etc.

When heater 14 is heated, the heat insulation ratio is comparatively low at the center of X-shaped heat insulator 94 and high in the region of recessed sections 92 on both ends because of air heat insulation (concave temperature distribution due to heat-insulating section: see pattern B in FIG. 12). Consequently, the convex temperature distribution of heater 14 is mutually compensated for, and a uniform temperature distribution of AOTF 202 is achieved (see pattern C in FIG. 12).

Thus, according to the eighth embodiment, the use of previously prepared X-shaped flat-plate heat-insulator 94 simplifies production and positioning of the heater 14 and heat insulators 94. Consequently, fabrication is simplified. Moreover, the X-shaped heat insulator 94 can adapt to the characteristics of heater 14 and homogenize the temperature distribution of soaking plate 12, thereby making it possible to heat the entire area of AOTF 202 to a uniform temperature. Consequently, satisfactory filter characteristics of AOTF 202 are exhibited and maintained, and at the same time, multi-channeling can be promoted and functionality increases. Furthermore, because heat insulator 94 has the spatial regions surrounded by recessed sections 92 for communication with the inside of package 18, air inside the spatial regions surrounded by recessed section 92 can be evacuated. Consequently, air inside the spatial regions surrounded by recessed section 92 does not expand and excellent heat insulating effects are achieved.

Moreover, even if the size of recessed sections 92, 92 of the X-shaped heat insulator 94 is less than the breadth of soaking plate 12 (or heater 14) as shown in FIG. 14, it is possible to homogenize the temperature distribution of AOTF 202.

FIG. 15 illustrates results of computer simulation of temperature distribution in an optical device by the optical device module according to the eighth embodiment. The use of X-shaped heat insulator 94 achieves temperature uniformity within 0.1° C. throughout the full width.

An optical device module according to a ninth embodiment is described next, referring to FIG. 16 and FIG. 17. FIG. 16 illustrates an essential portion of the optical device module of the ninth embodiment together with temperature characteristics. FIG. 16 is a side view, and FIG. 17 is a view as seen from the bottom surface. The configuration of the heat insulating means is explained in detail. The other components of the optical device module are identical to those in the first embodiment, and the detailed description thereof is omitted.

The heat insulating means is made of polyphenylene sulfide, Duracon, or phenol resin, etc., and is in the form of a flat-plate heat insulating element 104. An opening formed at the center serves as the spatial region 102 for air heat insulation. The spatial region 102 is shaped in order to deal with the case in which the center of heater 14 tends to acquire comparatively low temperature due to patterns of heat-generating resistors inside heater 14 (concave temperature distribution due to non-uniformity of the heater: see pattern A in FIG. 16). Part of spatial region 102 is spatially connected to air vent 106 formed in part of flat-plate heat insulator 104. The flat-plate heat insulator 104 is joined to the bottom surface of heater 14 and to the inner bottom surface of package 18 by adhesive such as epoxy resin, etc.

When heater 14 is heated, the heat insulation ratio is high at the center of flat-plate heat insulator 104, that is, in the spatial region 102 (convex temperature distribution due to heat-insulating section: see pattern B in FIG. 16). Consequently, this mutually compensates for the concave temperature distribution of heater 14, and a uniform temperature distribution of AOTF 202 is achieved (see pattern C in FIG. 16).

Thus, according to the ninth embodiment, using a flat-plate heat-insulator 104 having spatial region 102 in the center simplifies production and positioning of the heater 14 and heat insulators 104. Consequently, fabrication is simplified. Moreover, the heat insulator 104 that has spatial region 102 in the center can adapt to the characteristics of heater 14 and homogenize the temperature distribution of soaking plate 12, thereby making it possible to heat the entire area of AOTF 202 to a uniform temperature. Consequently, satisfactory filter characteristics of AOTF 202 are exhibited and maintained, and at the same time, multi-channeling can be promoted and functionality increases. Furthermore, because heat insulator 104 has an air vent 106 included in the spatial regions 102 for communication with the inside of package 18, air inside spatial regions 102 can be evacuated. Consequently, air inside each of spatial regions 102 does not expand and excellent heat insulating effects are achieved.

Moreover, in the flat-plate-form heat insulator 1.04, an additional air vent 106 may be formed at a position opposite to air vent 106, and the number of air vents formed may be set optionally.

An optical device module according to a tenth embodiment is described next, referring to FIG. 18 and FIG. 19. FIG. 18 illustrates an essential portion of the optical device module of the tenth embodiment together with temperature characteristics. FIG. 18 is a side view, and FIG. 19 is a view as seen from the bottom surface. The configuration of the heat insulating means is explained in detail. The other components of the optical device module are identical to those in the first embodiment, and the detailed description thereof is omitted.

The heat insulating means is made of polyphenylene sulfide, Duracon, or phenol resin, etc., and is in the form of a flat-plate heat insulator (heat insulating element) 118. An opening formed at the center serves as the spatial region 112 for air heat insulation (heat-insulating element). Recessed spatial regions 114, 116 for air heat insulation (heat insulating element) in the form of concave shape are provided on the forward edge side and backward edge side to deal with the case in which the center of heater 14 tends to acquire comparatively high temperature due to patterns of heat-generating resistors inside heater 14 (convex temperature distribution due to non-uniformity of the heater: see pattern A in FIG. 18). Part of spatial region 112 in the center opening is spatially connected to air vent 119 formed in part of flat-plate heat insulator 118. The flat-plate heat insulator 118 is joined to the bottom surface of heater 14 and to the inner bottom surface of package 18 by adhesive such as epoxy resin, etc.

When heater 14 is heated, the heat insulation ratio is low in the regions of flat-plate heat insulator 118 other than spatial regions 112, 114, 116 (concave temperature distribution due to heat insulation section: see pattern B in FIG. 18). Consequently, this mutually compensates for the convex temperature distribution of heater 14, and a uniform temperature distribution of AOTF 202 is achieved (see pattern C in FIG. 18).

Thus, according to the tenth embodiment, using a flat-plate heat-insulator 118 having spatial regions 112, 114, 116 on the center side and on both edges simplifies production and positioning of the heater 14 and heat insulators 118. Consequently, fabrication is simplified. Moreover, the heat insulator 118 that has spatial regions 112, 114, 116 on the center side and on both edges can adapt to the characteristics of heater 14 and homogenize the temperature distribution of soaking plate 12, thereby making it possible to heat the entire area of AOTF 202 to a uniform temperature. Consequently, satisfactory filter characteristics of AOTF 202 are exhibited and maintained, and at the same time, multi-channeling can be promoted and functionality increases. Furthermore, because heat insulator 118 has an air vent 119 included in the spatial region 112 for communication with the inside of package 18 while other spatial regions 114, 116 directly communicate with the inside of package 18, air inside spatial regions 112, 114, 116 can be evacuated. Consequently, air inside spatial regions 112, 114, 116 does not expand and excellent heat insulating effects are achieved.

Moreover, in the flat-plate-form heat insulator 118, an additional air vent 119 may be formed at a position opposite to air vent 119, and the number of air vents formed may be set optionally.

Figure 21:
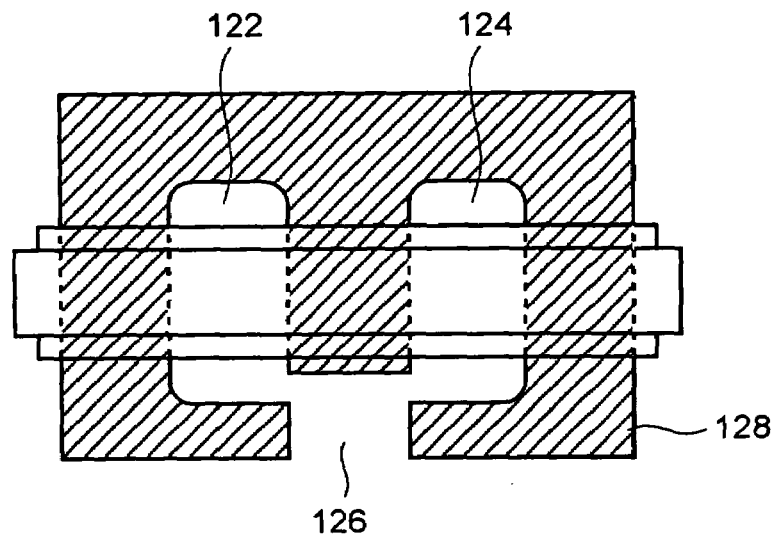
FIG. 21 illustrates an essential portion viewed from the bottom surface of the optical device module.

An optical device module according to an eleventh embodiment is described next, referring to FIG. 20 and FIG. 21. FIG. 20 illustrates an essential portion of the optical device module of the eleventh embodiment, together with temperature characteristics. FIG. 20 is a side view, and FIG. 21 is a view as seen from the bottom surface. The configuration of the heat insulating means is explained in detail. The other components of the optical device module are identical to those in the first embodiment, and the detailed description thereof is omitted.

The heat insulating means is made of polyphenylene sulfide, Duracon, or phenol resin, etc., and is configured as flat-plate heat insulator (heat insulating element) 128. Openings formed on two sides of the center of the heat insulator 128, serve as the spatial regions 122, 124 for air heat insulation (heat-insulating element). An air vent 126 spatially connected to both spatial regions 122, 124 on one end are provided to deal with the case in which the center side of heater 14 tends to acquire comparatively low temperature on both sides of the center of heater 14 due to patterns of heat-generating resistors inside heater 14 (concave temperature distribution due to non-uniformity of the heater: see pattern A in FIG. 20). The flat-plate heat insulator 128 is joined to the bottom surface of heater 14 and to the inner bottom surface of package 18 by adhesive such as epoxy resin, etc.

When heater 14 is heated, the heat insulation ratio is high in both spatial regions 122, 124 of flat-plate heat insulator 128 (convex temperature distribution due to heat insulation section: see pattern B in FIG. 20). Consequently, this mutually compensates for the concave temperature distribution of heater 14 and a uniform temperature distribution of AOTF 202 is achieved (see pattern C in FIG. 20).

Thus, according to the eleventh embodiment, flat-plate heat-insulator 128 that has spatial regions 122, 124, on both sides of the center simplifies production and positioning of the heater 14 and heat insulators 128. Consequently, fabrication is simplified. Moreover, the heat insulator 128 that has spatial regions 122, 124 on both sides of the center can adapt to the characteristics of heater 14 and homogenize the temperature distribution of soaking plate 12, thereby making it possible to heat the entire area of AOTF 202 to a uniform temperature. Consequently, satisfactory filter characteristics of AOTF 202 are exhibited and maintained, and at the same time, multi-channeling can be promoted and functionality increases. Furthermore, because spatial regions 122, 124 of heat insulator 128 communicate with the inside of package 18 via air vent 126, air inside spatial regions 122, 124 can be evacuated. Consequently, air inside spatial regions 122, 124 does not expand and excellent heat insulating effects are achieved.

Figure 22:
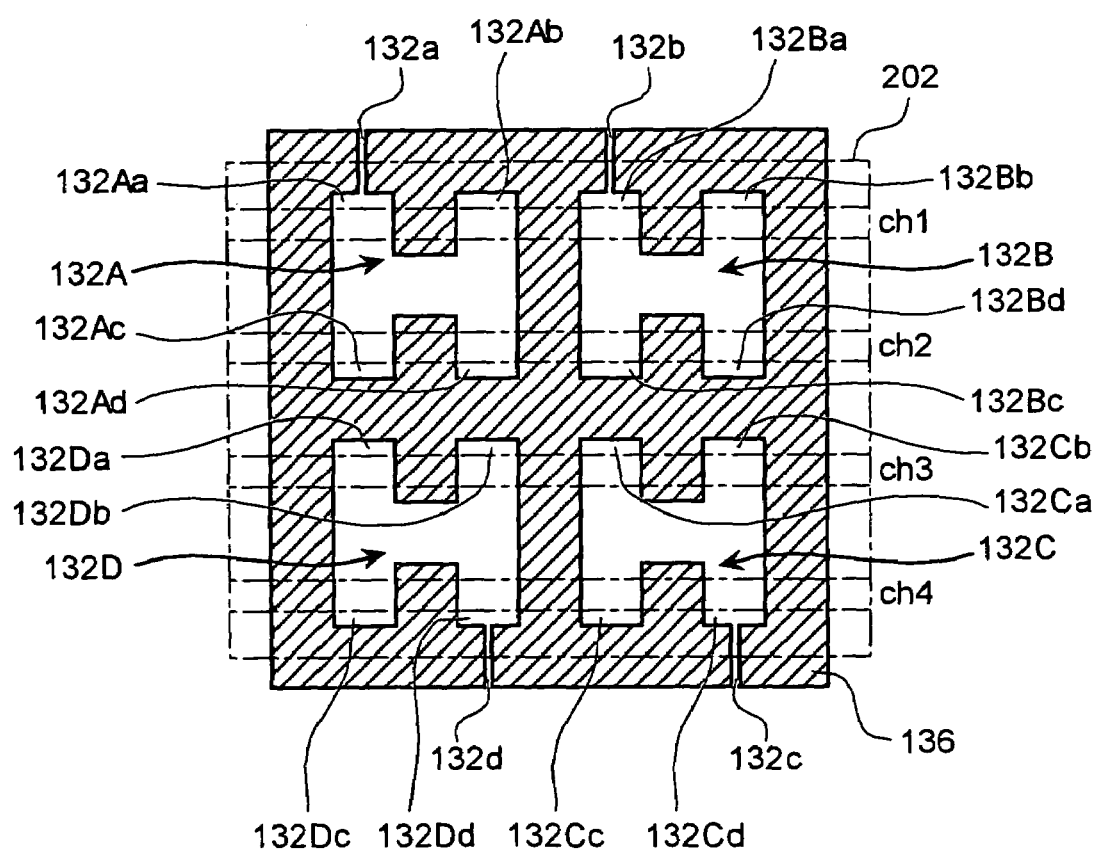
FIG. 22 is a plan view of an essential portion of an optical device module according to a twelfth embodiment.

An optical device module related to a twelfth embodiment is described next, referring to FIG. 22 and FIG. 23. FIG. 22 is a plan view of an essential section of the optical device module according to the twelfth embodiment. The AOTF 202 includes four channels corresponding to four waveguides (ch1, ch2, ch3, ch4). The AOTF 202 is illustrated by a dashed line in the figure. The waveguide of each channel is formed by connecting two AOTF 202 in series. This embodiment 12 is similar to those above described with the exception that the configuration of heat insulating means differs, and consequently, detailed description of other configurations is omitted. The number of channels of AOTF 202 can be set optionally.

The heat insulating means is made of polyphenylene sulfide, Duracon, or phenol resin, etc., and is configured as flat-plate heat insulator (heat-insulating element) 136 with H-shaped spatial regions 132A, 132B, 132C, 132D in the shape of lattices, formed at four places, for air heat insulation (heat insulating element). Air vents 132*a*, 132*b*, 132*c*, 132*d* spatially connected to each of spatial regions 132A, 132B, 132C, 132D to deal with the case in which four positions in the lattice form of heater 14 tend to acquire low temperature in the H-shaped regions due to patterns of heat-generating resistors in heater 14. The flat-plate heat insulator 136 is joined to the bottom surface of heater 14 and to the inner bottom surface of package 18 by adhesive such as epoxy resin, etc.

Figure 23:
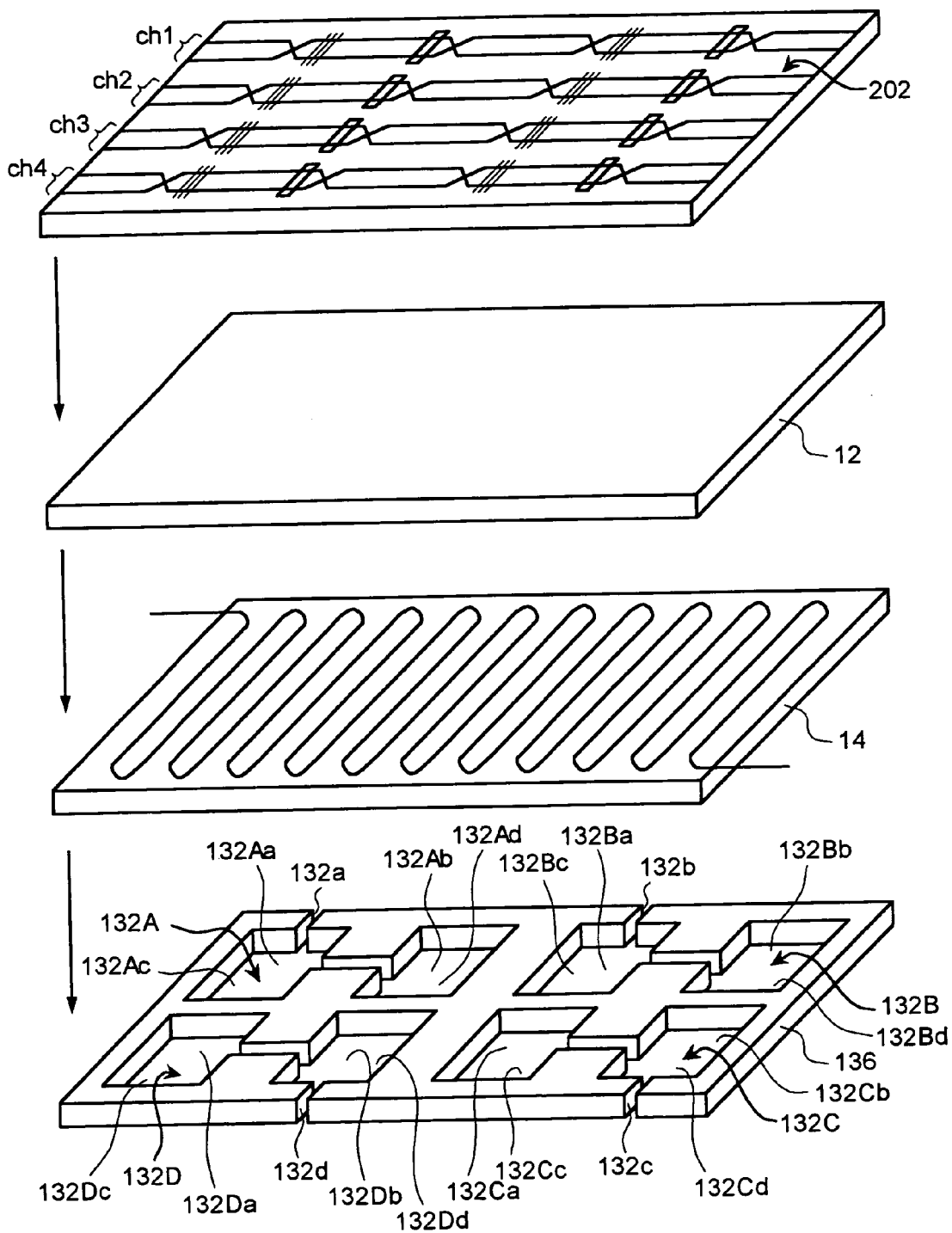
FIG. 23 is a perspective view of a construction of a lamination in a package in the optical device module.

FIG. 23 is a perspective view of construction of a lamination in a package in an optical device module according to the twelfth embodiment. The heat insulator 136 is joined to the inner bottom surface of package 18 (see FIG. 1), while heater 14 is joined to the heat insulator 136. The soaking plate 12 is joined on the top surface of heater 14, and on the top surface of soaking plate 12, AOTF 202 having four channels, that is, four waveguides (ch1, ch2, ch3, ch4), is joined with LiNbO3 substrate.

Referring now to FIG. 22 and FIG. 23, the arrangement of each spatial region 132A, 132B, 132C, 132D of heat insulator 136 and four waveguides (ch1, ch2, ch3, ch4) of AOTF 202 is described below. Four regions 132Aa, 132Ab, 132Ba, 132Bb of H-shaped spatial regions 132A, 132B form an inverted concave shape, and are located below waveguide ch1. Four regions 132Ac, 132Ad, 132Bc, 132Bd of H-shaped spatial regions 132A, 132B form a concave shape, and are located below waveguide ch2. Four regions 132Ca, 132Cb, 132Da, 132Db of H-shaped spatial regions 132C, 132D form an inverted concave shape, and are located below waveguide ch3. Four regions 132Cc, 132Cd, 132Dc, 132Dd of H-shaped spatial regions 132C, 132D form a concave shape, and are located below waveguide ch4.

When heater 14 is heated, the portions of H-shaped spatial regions 132A, 132B, 132C, 132C mutually compensate for non-uniform temperature distribution of heater 14 more finely because of air heat insulation, and can keep the temperature distribution of AOTF 202 uniform.

Thus, according to the twelfth embodiment, flat-plate heat-insulator 136 having H-shaped spatial regions 132A, 132B, 132C, 132D formed at four places in the shape of lattices simplifies production and positioning of the heater 14 and heat insulators 136. Consequently, fabrication is simplified. Moreover, the heat insulator 136 having H-shaped spatial regions 132A, 132B, 132C, 132D can adapt to more complicated temperature characteristics of heater 14 or positional relationship of 4-channel configuration including four waveguides (ch1, ch2, ch3, ch4). Thus, it is possible to heat the entire area of AOTF 202 to a uniform temperature. Consequently, satisfactory filter characteristics of AOTF 202 are exhibited and maintained, and at the same time, multi-channeling can be promoted and functionality increases.

Furthermore, because each of H-shaped spatial regions 132A, 132B, 132C, 132D communicate with the inside of package 18 via air vents 132*a*, 132*b*, 132*c*, 132*d*, air inside each of spatial regions 132A, 132B, 132C, 132D can be evacuated. Consequently, air inside each of spatial regions 132A, 132B, 132C, and 132D does not expand and excellent heat insulating effects are achieved.

Optionally, a plurality of air vents may be formed in flat-plate-shape heat insulator 136, in addition to one air vent per spatial region, to communicate with each of the spatial regions.

Figure 24:
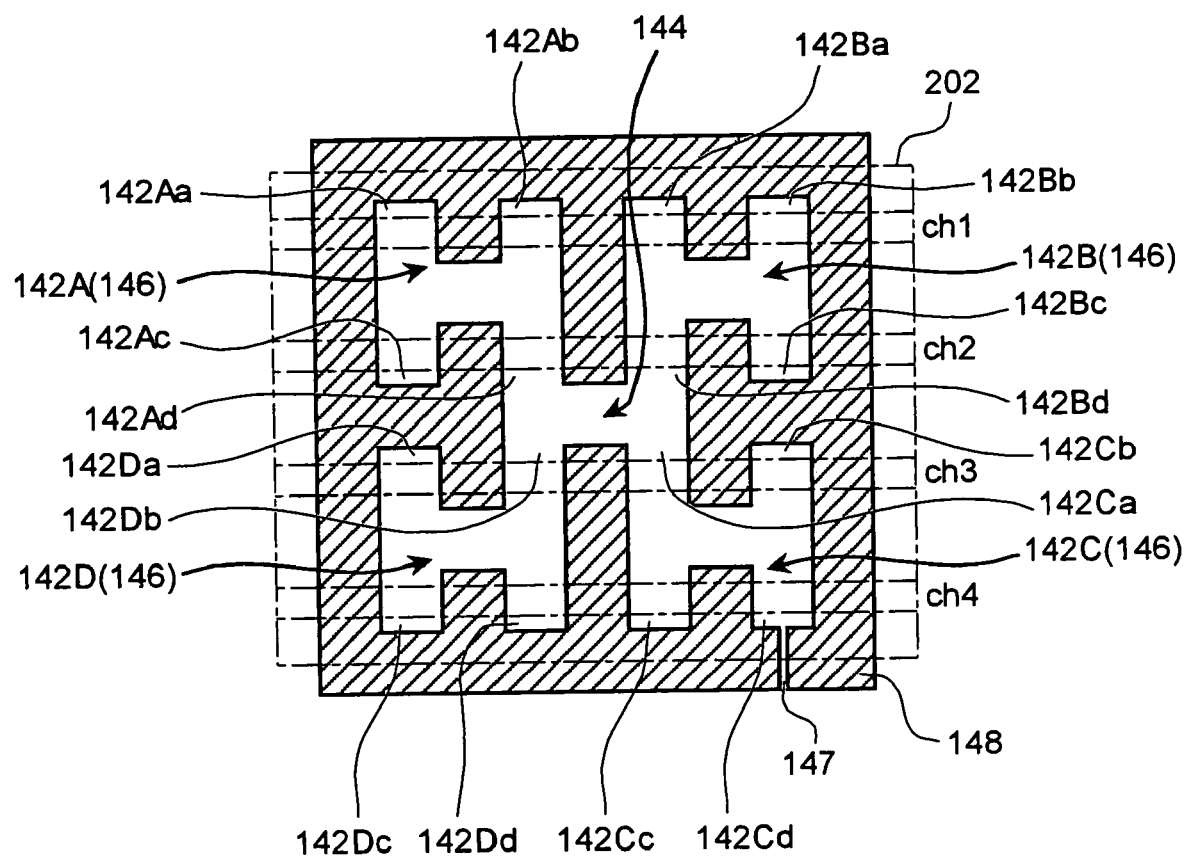
FIG. 24 is a plan view of an essential section of an optical device module according to a thirteenth embodiment.

An optical device module according to a thirteenth embodiment is described next, referring to FIG. 24. FIG. 24 is a plan view of an essential section of the optical device module according to the thirteenth embodiment. AOTF 202 includes four channels corresponding to four waveguides (ch1, ch2, ch3, ch4). The construction of the lamination inside package 18 in this embodiment is similar to that described in the twelfth embodiment (see FIG. 23) with the exception that the construction of heat insulating means differs. The number of channels of AOTF 202 can be set optionally.

The heat insulating means is made of polyphenylene sulfide, Duracon, or phenol resin, etc., and is configured as flat-plate heat insulator (heat-insulating element) 148 with H-shaped spatial regions 142A, 142B, 142C, 142D in the shape of lattices, formed at four places, for air heat insulation (heat insulating element). Spatial regions 142A, 142B, 142C, 142D are spatially connected to each other, such that the spatial connections form another spatial region 144 at the center of heat insulator 148. Thus, one spatial region 146 is formed as a whole (see FIG. 24). An air vent 147 spatially connected to part of the spatial region 146 are provided, to deal with the case in which four positions in the lattice form of heater 14 tend to acquire low temperature in the H-shaped regions due to patterns of heat-generating resistors in heater 14. The flat-plate heat insulator 148 is joined to the bottom surface of heater 14 and to the inner bottom surface of package 18 by adhesive such as epoxy resin, etc.

Next, the arrangement of each spatial regions 142A, 142B, 142C, 142D of heat insulator 148 and four waveguides ch1, ch2, ch3, ch4 of AOTF 202 is described. As shown in FIG. 24, four regions 142Aa, 142Ab, 142Ba, 142Bb of the spatial regions 142A, 142B and form an inverted concave shape, and are located below waveguide ch1. Four regions 142Ac, 142Ad, 142Bc, 142Bd of the spatial regions 142A, 142B form a concave shape, and are located below waveguide ch2. Four regions 142Ca, 142Cb, 142Da, 142Db of the spatial regions 142C, 142D form an inverted concave shape, and are located below waveguide ch3. Four regions 142Cc, 142Cd, 142Dc, 142Dd of the spatial regions 142C, 142D form an inverted concave shape, and are located below waveguide ch4.

When heater 14 is heated, the entire spatial region 146 containing H-shaped spatial regions 142A, 142B, 142C, 142D formed in flat-plate-form heat insulator 148 mutually compensate for non-uniform temperature distribution of heater 14 more finely because of air heat insulation, and can keep the temperature distribution of AOTF 202 more uniform.

Thus, according to the thirteenth embodiment, flat-plate heat-insulator 148 having one spatial region 146 containing H-shaped spatial regions 142A, 142B, 142C, 142D formed at four places in the shape of lattices simplifies production and positioning of the heater 14 and heat insulators 148. Consequently, fabrication is simplified. Moreover, the heat insulator 148 can adapt to more complicated temperature characteristics of heater 14 and homogenize the temperature distribution of soaking plate 12. Thus, it is possible to heat the entire area of AOTF 202 to a uniform temperature. Consequently, satisfactory filter characteristics of AOTF 202 are exhibited and maintained, and at the same time, multi-channeling can be promoted and functionality increases.

Furthermore, because each of spatial regions 142A, 142B, 142C, 142D communicate with the inside of package 18 via air vent 147, air inside each of spatial regions 142A, 142B, 142C, 142D can be evacuated. Consequently, air inside each of spatial regions 142A, 142B, 142C, and 142D does not expand and excellent heat insulating effects are achieved.

Optionally, a plurality of air vents 147 may be formed in the spatial region 146 of flat-plate-shape heat insulator 148.

Figure 25A:
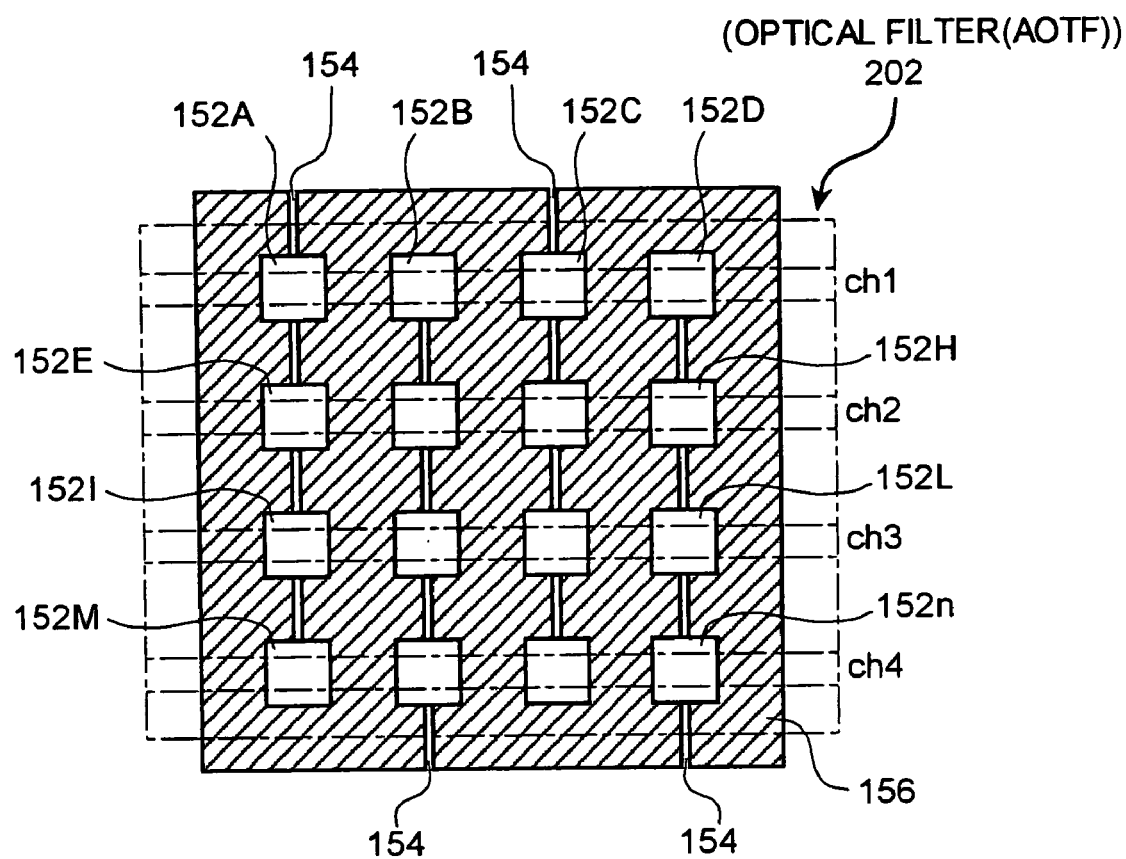
FIG. 25A illustrates an essential section of the optical device module according to a fourteenth embodiment.

An optical device module according to a fourteenth embodiment is described next, referring to FIG. 25A and FIG. 25B. FIG. 25A illustrates an essential section of the optical device module according to a fourteenth embodiment. An AOTF 202 includes four channels corresponding to four waveguides (ch1, ch2, ch3, ch4). The construction of the lamination inside package 18 in this embodiment is similar to that described in the twelfth embodiment (see FIG. 23) with the exception that the construction of heat insulating means differs. The number of channels of AOTF 202 can be set optionally.

As shown in the plan view of FIG. 25A, the heat insulating means is made of polyphenylene sulfide, Duracon, or phenol resin, etc., and is configured as flat-plate heat insulator (heat-insulating element) 156 with square-shaped spatial regions 152A, 152B, . . . , 152n formed at a plurality of places in the shape of lattices, for air heat insulation (heat insulating element). Each of the longitudinal air-vents 154 are spatially connected to the spatial regions of one column. For example, spatial regions 152A, 152E, 152I, 152M are connected by one longitudinal air-vent. The air-vents are provided in order to deal with the case in which a plurality of regions corresponding to the spatial regions tend to acquire low temperature due to patterns of heat-generating resistors in heater 14, or the case in which it is desired to heat regions where a plurality of waveguides (ch1, ch2, ch3, ch4) of AOTF 202 are located.

Next, the arrangement of each column of spatial regions 152A, 152E, 152I, 152M, etc. of heat insulator 156 and four waveguides ch1, ch2, ch3, ch4 of AOTF 202 is described. As shown in FIG. 25A, spatial regions 152A, etc. aligned in a single horizontal line are located below waveguide ch1. Spatial regions 152E, etc. aligned in the next horizontal line are located below waveguide ch2. Spatial regions 152I, etc. aligned in the next horizontal line are located below waveguide ch3. Spatial regions 152M, etc. aligned in the next horizontal line are located below waveguide ch4.

Figure 25B:
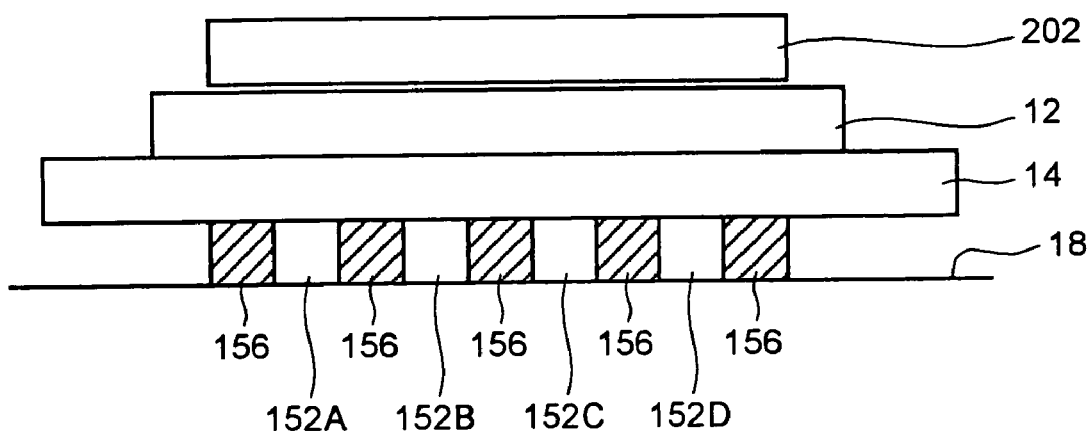
FIG. 25B is a side view of the optical device module.

As shown in the side view in FIG. 25B, heat insulator 156 is joined to the inner bottom surface of package 18, heater 14 to the top surface of heat insulator 156, soaking plate (soaking member) 12 to the top surface of heater 14, and AOTF 202 is joined to the top surface of soaking plate 12. This arrangement is the same in the case of this embodiment 14 as well as in the embodiments 1 through 13.

When heater 14 is heated, each of lattice-form spatial regions 152A, etc. formed in flat-plate-form heat insulator 156 mutually compensate for non-uniform temperature distribution of heater 14 more finely because of air heat insulation, and can keep the temperature distribution of AOTF 202 uniform. Optical signals free of optical loss can be outputted from each waveguide (ch1, ch2, ch3, ch4). Moreover, as shown in FIG. 25B, since the size of soaking plate 12 and heater 14 (area of the top surface), both, is set greater than that of the AOTF 202, it is possible to maintain the temperature distribution of AOTF 202 uniform.

Thus, according to the fourteenth embodiment, flat-plate heat-insulator 156 containing a plurality of spatial regions 152A, etc. configured in a lattice-form, simplifies production and positioning of the heater 14 and heat insulators 156. Consequently, fabrication is simplified. Moreover, the heat insulator 128 containing spatial regions 152A, etc. arranged in a lattice form at a plurality of places can adapt to more complicated temperature characteristics of heater 14 and can homogenize the temperature distribution of soaking plate 12, thereby making it possible to heat the entire area of AOTF 202 to a uniform temperature. Consequently, satisfactory filter characteristics of AOTF 202 are exhibited and maintained, and at the same time, multi-channeling can be promoted and functionality increases.

Furthermore, because each of spatial regions 152A, etc. communicates with the inside of package 18 via air vent 154, air inside each of spatial regions 152A, etc. can be evacuated. Consequently, air inside each of spatial regions 152A, etc. does not expanded and excellent heat insulating effects are achieved.

Optionally, for each of spatial regions of flat-plate-shape heat insulator 156, a plurality of longitudinal air vents 154 may be formed in addition to air vents 154.

Figure 26:
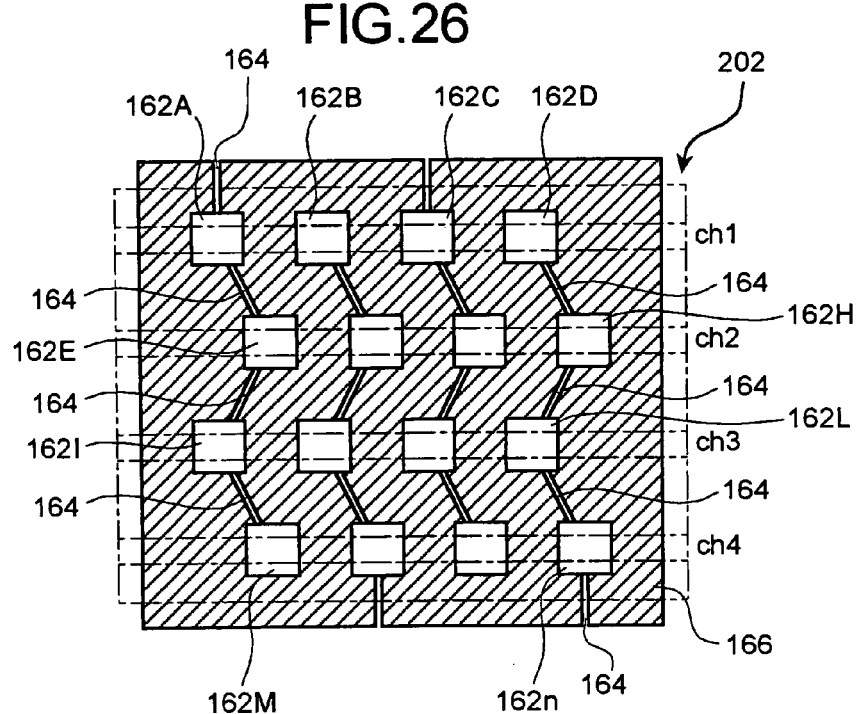
FIG. 26 illustrates an essential section of an optical device module according to a fifteenth embodiment.

An optical device module according to a fifteenth embodiment is described next, referring to FIG. 26. FIG. 26 illustrates an essential section of the optical device module according to the fifteenth embodiment. An AOTF 202 includes four channels corresponding to four waveguides (ch1, ch2, ch3, ch4). The construction of the lamination inside package 18 in this embodiment is similar to that described in the twelfth embodiment (see FIG. 23) with the exception that the construction of heat insulating means differs. The number of channels of AOTF 202 can be set optionally.

The heat insulating means is made of polyphenylene sulfide, Duracon, or phenol resin, etc., and is configured as flat-plate heat insulator (heat-insulating element) 166 with spatial regions 162A, 162B, . . . , 162n formed at a plurality of places in the shape of lattices in a zigzag manner for air heat insulation (heat insulating element). Spatial regions 162A, 162E, 162I, 162M, etc. are aligned in a longitudinal zigzag line respect to each of spatial region 162A, 162B, 162C, 162D, and air vent 164 spatially connecting each zigzag longitudinal line is provided, to deal with the case in which a plurality of regions in the lattice form of heater 14 tend to acquire low temperature due to patterns of heat-generating resistors in heater 14 or the case in which it is desired to heat regions where the waveguides of AOTF 202 are located.

Next, the arrangement of each spatial region 162A, 162E, 162I, 162M, etc. of heat insulator 166 and four waveguides ch1, ch2, ch3, ch4, of AOTF-202 is described. As shown in the plan view in FIG. 26, spatial regions 162A, etc. aligned in a single horizontal line are located below waveguide ch1. Spatial regions 162E, etc. aligned in the next horizontal line are located below waveguide ch2. Spatial regions 162I, etc. aligned in the next horizontal line are located below waveguide ch3. Spatial regions 162M, etc. aligned in the next horizontal line are located below waveguide ch4.

When heater 14 is heated, each of zigzag lattice-form spatial regions 162A, etc., formed in flat-plate-form heat insulator 166 mutually compensate for non-uniform temperature distribution of heater 14 more finely because of air heat insulation, and can keep the temperature distribution of AOTF 202 uniform. Thus, optical signals free of optical loss can be outputted.

Thus, according to the fifteenth embodiment, flat-plate heat-insulator 166 containing a plurality of spatial regions 162A, etc. forming a zigzag lattice-form simplifies production and positioning of the heater 14 and heat insulators 166. Consequently, fabrication is simplified. Moreover, the heat insulator 166 containing spatial regions 162A, etc. arranged in a lattice form at a plurality of places can adapt to more complicated temperature characteristics of heater 14 and can homogenize the temperature distribution of soaking plate 12, thereby making it possible to heat the whole area of AOTF 202 to a uniform temperature. Furthermore, it is possible to heat the whole area including waveguide (ch1, ch2, ch3, ch4) portions of AOTF 202 to a uniform temperature. Consequently, satisfactory filter characteristics of AOTF are exhibited and maintained, and at the same time, multi-channeling can be promoted and functionality increases.

Moreover, because each of spatial regions 162A, etc. communicate with the inside of package 18 via air vent 164, air inside each of spatial regions 162A, etc. can be evacuated. Consequently, air inside each of spatial regions 162A, etc. does not expand and excellent heat insulating effects are achieved.

Optionally, for each of spatial regions 162A of flat-plate-shape heat insulator 166, a plurality of longitudinal air vents 164 may be formed in addition to air vents 164.

In each of embodiments described above, each of spatial region 24, etc. is filled with air hermetically sealed in package 18 to achieve air heat insulation. However, heat insulation may be achieved by evacuating the package 18 (creating vacuum), or by filling nitrogen or dry nitrogen in each of spatial region 24.

In addition, it is needless to say that the present invention can be applied to an optical waveguide grating (AWG) which uses an optical add/drop module array.

According to the optical device module of the present invention, it is possible to homogenize the overall device temperature without being susceptible to the temperature gradient of the outside, and to manufacture easily at low cost without increasing heater power consumption required for soaking, and promote multi-channeling requirements. Particularly, when the present invention is applied to waveguide type optical devices, the uniform temperature distribution can be maintained and the number of channels can be increased easily with an extremely simple configuration.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical device module comprising:
   an optical device;
   a soaking unit fixed to one surface of the optical device;
   a heating/cooling unit fixed to one surface of the soaking unit, wherein the heating/cooling unit performs a function selected from a group consisting of heating the optical device using self-generated heat and cooling the optical device by absorbing heat;
   only one heat-insulating layer, the heat-insulating layer being fixed to one surface of the heating/cooling unit; and
   a package completely enclosing the optical device, the soaking unit, the heating/cooling unit, and the heat-insulating layer,
   wherein the heat-insulating layer is fixed to only one surface of the package.

2. The optical device module according to claim 1, wherein the heat-insulating layer comprises, selectively, one heat-insulating element having a predefined heat conductivity, or a plurality of heat-insulating elements having respective, different heat conductivities.

3. The optical device module according to claim 1, wherein the heat-insulating layer comprises a heat-insulating element selected from a group consisting of at least one heat-insulating element and at least two heat-insulating elements, wherein the at least one heat-insulating element is selected from a group consisting of polyphenylene sulfide, Duracon, and phenol resin, and wherein the at least two heat-insulating elements are selected from a group consisting of air, nitrogen, and dry nitrogen.

4. The optical device module according to claim 1, wherein the heat-insulating layer is a flat-plate.

5. The optical device module according to claim 1, wherein the heating/cooling unit is fixed to the heat-insulating layer and the heat-insulating layer is fixed to the package using a predetermined adhesive.

6. The optical device module according to claim 1, wherein the optical device is a waveguide type optical device.

7. The optical device module according to claim 1, wherein the soaking unit is made of material that has good heat conductivity, is a flat-plate, and has uniform thickness.

8. The optical device module according to claim 1, wherein the heating/cooling unit is selected from a group consisting of a heater and a Peltier element, and wherein the heating/cooling unit performs a function selected from a group consisting of heating the soaking unit using self-generated heat and cooling the soaking unit by absorbing heat.

9. The optical device module according to claim 1, wherein the package is selected from a group consisting of a package filled with air and a package that is evacuated.

10. The optical device module according to claim 1, wherein the package is filled with an element selected from a group consisting of nitrogen and dry nitrogen 11. The optical device module according to claim 1, wherein the heat-insulating layer comprises a solid heat-insulating element of a predetermined shape, and a plurality of spatial regions located at predetermined positions within the solid heat-insulating element.

12. The optical device module according to claim 1, wherein the heat-insulating layer comprises a spatial region formed at a predetermined position.

13. The optical device module according to claim 12, wherein the spatial region includes an air vent that is an opening for communicating with the package.

14. The optical device module according to claim 12, wherein the heat-insulating layer comprises a plurality of spatial regions configured so that an interval between the spatial regions is any one of small and large.

15. The optical device module according to claim 1, wherein the heat-insulating layer comprises a plurality of spatial regions formed at predetermined intervals.

16. An optical device module comprising:
an optical device;
a soaking unit fixed to one surface of the optical device;
a heating/cooling unit fixed to one surface of the soaking unit, wherein the heating/cooling unit performs a function selected from a group consisting of heating the optical device using self-generated heat and cooling the optical device by absorbing heat;
a heat-insulating unit fixed to one surface of the heating/cooling unit; and
a package completely enclosing the optical device, the soaking unit, the heating/cooling unit, and the heat-insulating unit,
wherein the heat-insulating unit is fixed to one surface of the package,
wherein the heat-insulating unit comprises a spatial region formed at a predetermined position, and
wherein the heat-insulating unit comprises a plurality of heat-insulating elements with identical cross sections forming a meandrous shape and a plurality of spatial regions spaced at predetermined intervals between the heat-insulating elements.

17. An optical device module comprising:
an optical device;
a soaking unit fixed to one surface of the optical device;
a heating/cooling unit fixed to one surface of the soaking unit, wherein the heating/cooling unit performs a function selected from a group consisting of heating the optical device using self-generated heat and cooling the optical device by absorbing heat;
a heat-insulating unit fixed to one surface of the heating/cooling unit; and
a package completely enclosing the optical device, the soaking unit, the heating/cooling unit, and the heat-insulating unit,
wherein the heat-insulating unit is fixed to one surface of the package,
wherein the heat-insulating unit comprises a spatial region formed at a predetermined position, and
wherein the heat-insulating unit comprises a plurality of heat-insulating elements arranged in the form of teeth of a comb and a plurality of spatial regions between the heat-insulating elements.

18. An optical device module comprising:
an optical device;
a soaking unit fixed to one surface of the optical device;
a heating/cooling unit fixed to one surface of the soaking unit, wherein the heating/cooling unit performs a function selected from a group consisting of heating the optical device using self-generated heat and cooling the optical device by absorbing heat;
a heat-insulating unit fixed to one surface of the heating/cooling unit; and
a package completely enclosing the optical device, the soaking unit, the heating/cooling unit, and the heat-insulating unit,
wherein the heat-insulating unit is fixed to one surface of the package,
wherein the heat-insulating unit comprises a spatial region formed at a predetermined position,
wherein the heat-insulating unit comprises a pair of heat-insulating elements and a plurality of spatial regions between the heat-insulating elements, and
wherein each of the pair of heat-insulating elements is in the form of teeth of a comb.

19. An optical device module comprising:
an optical device;
a soaking unit fixed to one surface of the optical device;
a heating/cooling unit fixed to one surface of the soaking unit, wherein the heating/cooling unit performs a function selected from a group consisting of heating the optical device using self-generated heat and cooling the optical device by absorbing heat;
a heat-insulating unit fixed to one surface of the heating/cooling unit; and
a package completely enclosing the optical device, the soaking unit, the heating/cooling unit, and the heat-insulating unit,
wherein the heat-insulating unit is fixed to one surface of the package,
wherein the heat-insulating unit comprises a spatial region formed at a predetermined position,
wherein the heat-insulating unit comprises a plurality of heat-insulating elements with identical cross sections and a plurality of spatial regions spaced at predetermined intervals, and
wherein the heat-insulating elements and the spatial regions together form a bridge shape.

20. An optical device module comprising:
an optical device;
a soaking unit fixed to one surface of the optical device;
a heating/cooling unit fixed to one surface of the soaking unit, wherein the heating/cooling unit performs a function selected from a group consisting of heating the optical device using self-generated heat and cooling the optical device by absorbing heat;
only one heat-insulating layer, the heat-insulating layer being fixed to one surface of the heating/cooling unit; and
a package completely enclosing the optical device, the soaking unit, the heating/cooling unit, and the heat-insulating layer,
wherein the heat-insulating layer is fixed to only one surface of the package,
wherein the heat-insulating layer comprises a spatial region formed at a predetermined position,
wherein the heat-insulating layer comprises a solid heat-insulating element of a predetermined shape, and a plurality of spatial regions located at predetermined positions within the solid heat-insulating element, wherein heat-insulating effects vary distributively over a combined region encompassing the spatial regions and the heat-insulating elements.

21. An optical device module, comprising:
an optical device;
a soaking unit fixed at a first surface thereof to a first surface of the optical device;

a heating/cooling unit, fixed at a first surface thereof to a second surface of the soaking unit, selectively heating the optical device by self-generating heat and cooling the optical device by absorbing heat;

only one heat-insulating layer, the heat-insulating layer being fixed at a first surface thereof to a second surface of the heating/cooling unit; and a package completely enclosing the optical device, the soaking unit, the heating/cooling unit, and the heat-insulating layer, the heat-insulating layer being fixed at a second surface thereof to a surface of the package.

22. The optical device module according to claim 21, wherein the heat-insulating layer comprises, selectively, one heat-insulating element having a predefined heat conductivity, or a plurality of heat-insulating elements having respective, different heat conductivities.

23. The optical device module according to claim 21, wherein the heat-insulating layer comprises a solid heat-insulating element of a predetermined shape, and a plurality of spatial regions located at predetermined positions within the solid heat-insulating element.

24. An optical device module comprising:

an optical device;

a soaking unit fixed to one surface of the optical device;

a heating/cooling unit fixed to one surface of the soaking unit, wherein the heating/cooling unit performs a function selected from a group consisting of heating the optical device using self-generated heat and cooling the optical device by absorbing heat;

only one heat-insulating layer, the heat-insulating layer being fixed to one surface of the heating/cooling unit; and a package completely enclosing the optical device, the soaking unit, the heating/cooling unit, and the heat-insulating layer, wherein the heat-insulating layer is fixed to only one surface of the package.

* * * * *

UNITED STATES PATENT AND TRADEMARK OFFICE
CERTIFICATE OF CORRECTION

| | |
|---|---|
| PATENT NO. | : 7,476,038 B2 |
| APPLICATION NO. | : 10/805481 |
| DATED | : January 13, 2009 |
| INVENTOR(S) | : Yoichi Oikawa et al. |

Page 1 of 1

It is certified that error appears in the above-identified patent and that said Letters Patent is hereby corrected as shown below:

Column 20, Line 65, after "nitrogen" insert --.--.

Signed and Sealed this

Seventh Day of April, 2009

JOHN DOLL
*Acting Director of the United States Patent and Trademark Office*